US009946145B2

(12) United States Patent
Miura et al.

(10) Patent No.: US 9,946,145 B2
(45) Date of Patent: *Apr. 17, 2018

(54) ILLUMINATION UNIT, PROJECTION TYPE DISPLAY UNIT, AND DIRECT VIEW TYPE DISPLAY UNIT

(71) Applicant: Sony Corporation, Tokyo (JP)

(72) Inventors: Koji Miura, Tokyo (JP); Kazuyuki Takahashi, Kanagawa (JP); Tatsuya Oiwa, Tokyo (JP)

(73) Assignee: SONY CORPORTATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,933

(22) Filed: May 27, 2015

(65) Prior Publication Data

US 2015/0253655 A1 Sep. 10, 2015

Related U.S. Application Data

(63) Continuation of application No. 13/246,217, filed on Sep. 27, 2011, now Pat. No. 9,124,816.

(30) Foreign Application Priority Data

Oct. 12, 2010 (JP) .................................. 2010-229372

(51) Int. Cl.
*G03B 21/14* (2006.01)
*G03B 21/20* (2006.01)
(Continued)

(52) U.S. Cl.
CPC .............. *G03B 21/208* (2013.01); *F21K 9/60* (2016.08); *G02B 3/0056* (2013.01);
(Continued)

(58) Field of Classification Search
CPC .. G03B 21/14; G03B 21/208; G03B 21/2033; H04N 9/3164; G02B 3/0056; G02B 27/141; F21K 9/60
(Continued)

(56) References Cited

U.S. PATENT DOCUMENTS 5,013,660 A * 5/1991 Kasuya .................. C12M 35/02
435/173.5
6,220,714 B1 4/2001 Eguchi
(Continued)

FOREIGN PATENT DOCUMENTS

CN 1334487 2/2002
EP 1 184 706 3/2002
(Continued)

OTHER PUBLICATIONS

Japanese Office Action dated Apr. 28, 2015 in corresponding Japanese Application No. 2014-114418.
(Continued)

*Primary Examiner* — Georgia Y Epps
*Assistant Examiner* — Kevin Wyatt
(74) *Attorney, Agent, or Firm* — Chip Law Group

(57) ABSTRACT

An illumination unit includes one or more light sources each including a solid-state light-emitting device having a light emission region configured of one or more light-emission spots, one or more traveling-direction angle conversion device each converting a traveling-direction-angle of light, and an integrator including a first fly-eye lens having cells which receive light from the traveling-direction angle conversion device and a second fly-eye lens having cells which receive light from the first fly-eye lens, the integrator uniformalizing illumination distribution in a predetermined illumination area. An optical system configured with the traveling-direction angle conversion device and the first and
(Continued)

second fly-eye lenses has an optical magnification which allows each of light source images to have a size not exceeding a size of the cell in the second fly-eye lens, the light source images being formed on the second fly-eye lens by the respective cells in the first fly-eye lens.

11 Claims, 21 Drawing Sheets

(51) Int. Cl.
    *H04N 9/31*     (2006.01)
    *G02B 3/00*     (2006.01)
    *G02B 27/14*     (2006.01)
    *F21K 9/60*     (2016.01)

(52) U.S. Cl.
    CPC ........... *G02B 27/141* (2013.01); *G03B 21/14* (2013.01); *G03B 21/2033* (2013.01); *H04N 9/3164* (2013.01)

(58) Field of Classification Search
    USPC ...................................... 353/38; 362/19, 235
    See application file for complete search history.

(56) References Cited

U.S. PATENT DOCUMENTS

2007/0024974 A1     2/2007    Itoh et al.
2007/0253197 A1     11/2007    Kung et al.
2010/0049055 A1*    2/2010    Freudenberg ........ A61B 5/0059
                                                                                                               600/475

FOREIGN PATENT DOCUMENTS

| EP | 1 577 697 | 9/2005 |
|---|---|---|
| JP | 08-31736 | 2/1996 |
| JP | 11-260144 | 9/1999 |
| JP | 2000-029138 | 1/2000 |
| JP | 2001-343706 | 12/2001 |
| JP | 2004-157405 | 3/2004 |
| JP | 2004-220015 | 8/2004 |
| JP | 2005164838 | 6/2005 |
| JP | 2005-352205 | 12/2005 |
| JP | 2008-134324 | 6/2008 |
| JP | 2009-187041 | 8/2009 |
| JP | 2010-186754 | 8/2010 |
| WO | WO99/16040 | 4/1999 |

OTHER PUBLICATIONS

Chinese Office Action dated Nov. 2, 2014 in corresponding Chinese Patent Application No. 201110300884.9.
Japanese Office Action dated Apr. 1, 2014 in corresponding Japanese Patent Applicaiton No. 2010-229372.
European Search Report dated Jun. 3, 2013 in corresponding European Patent Application No. 11008073.6.

* cited by examiner

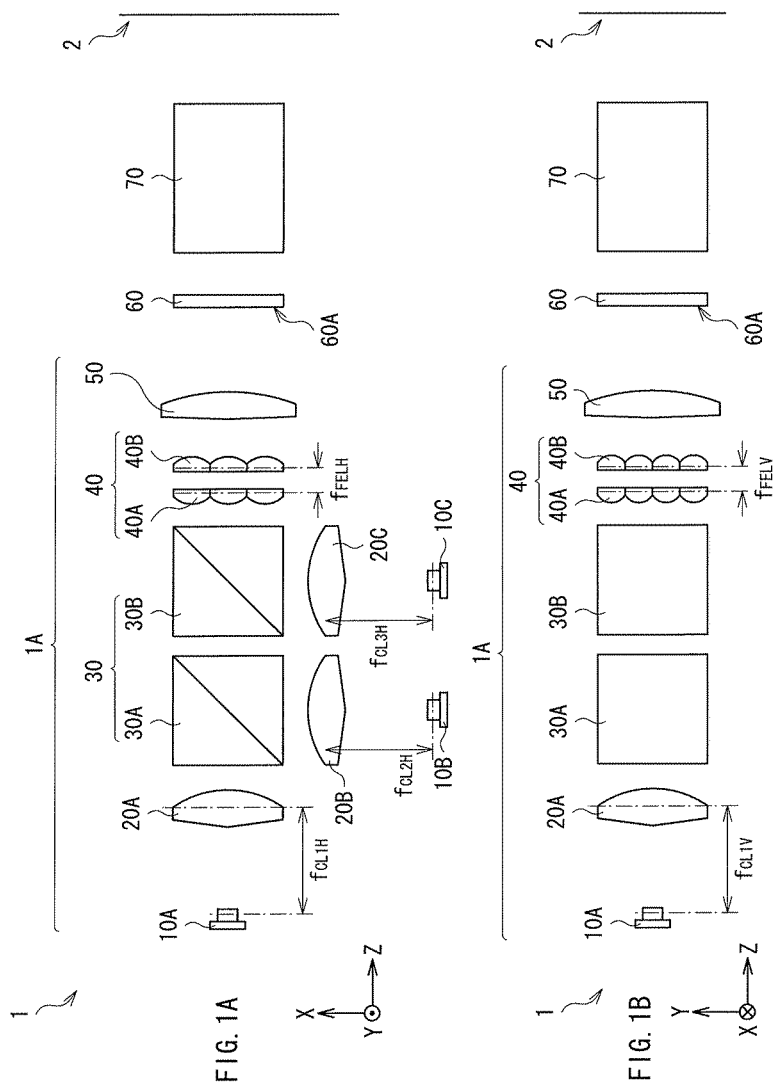

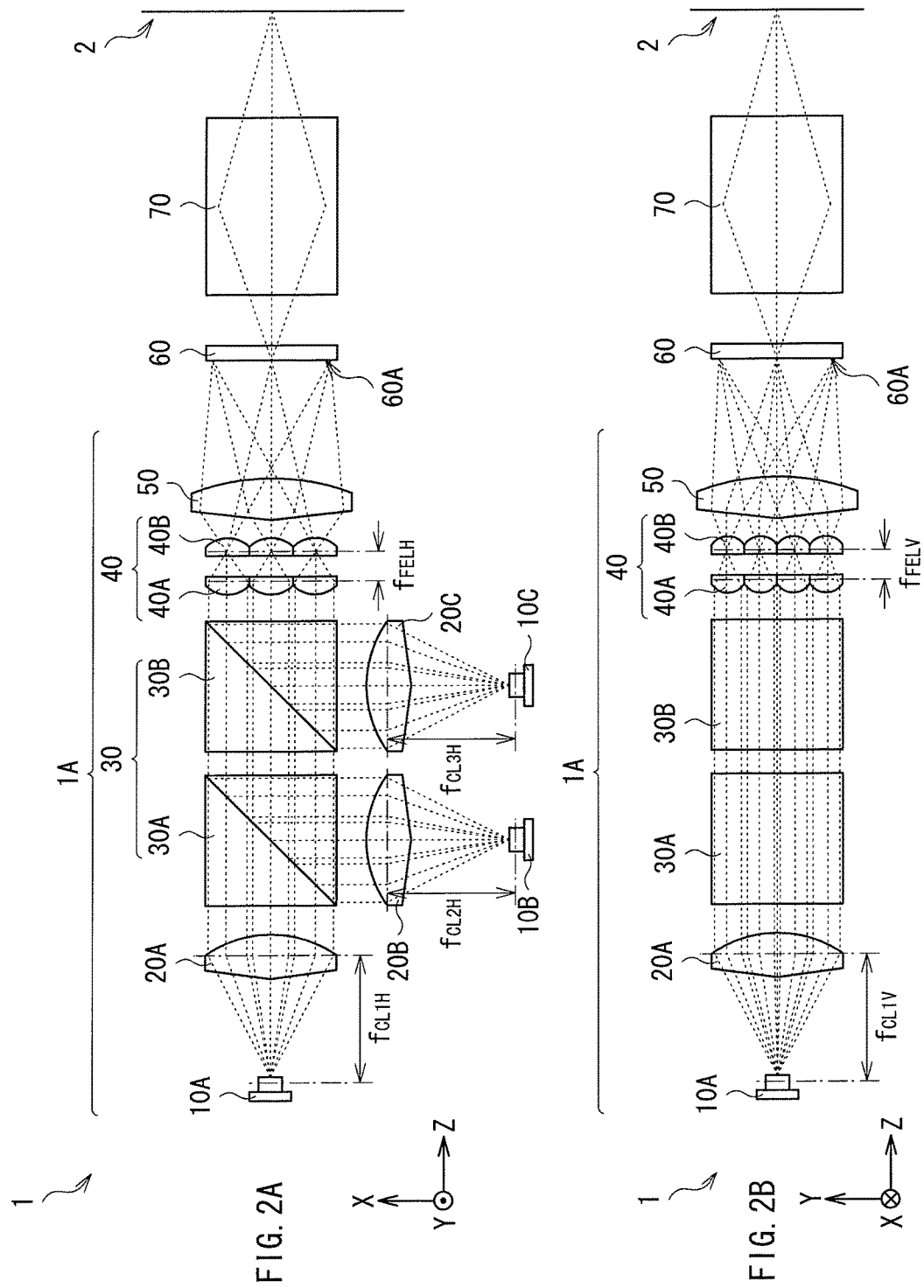

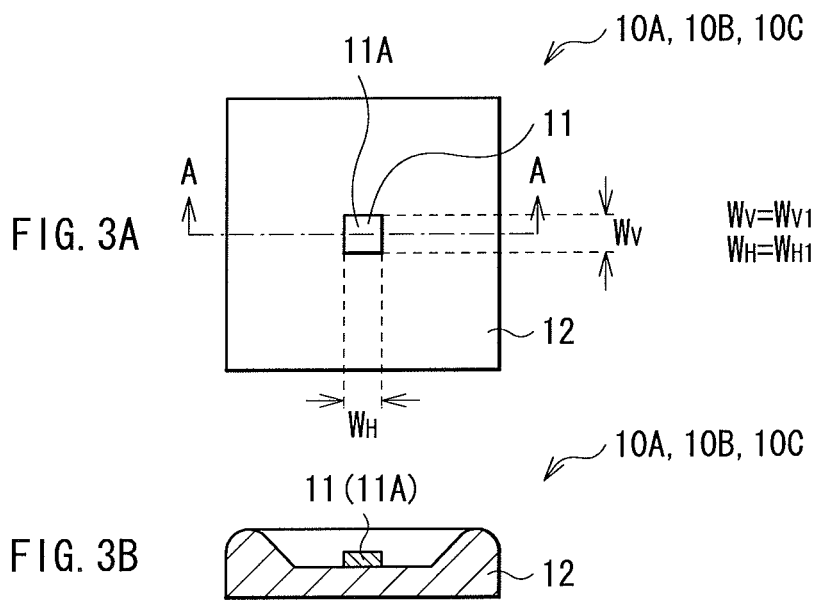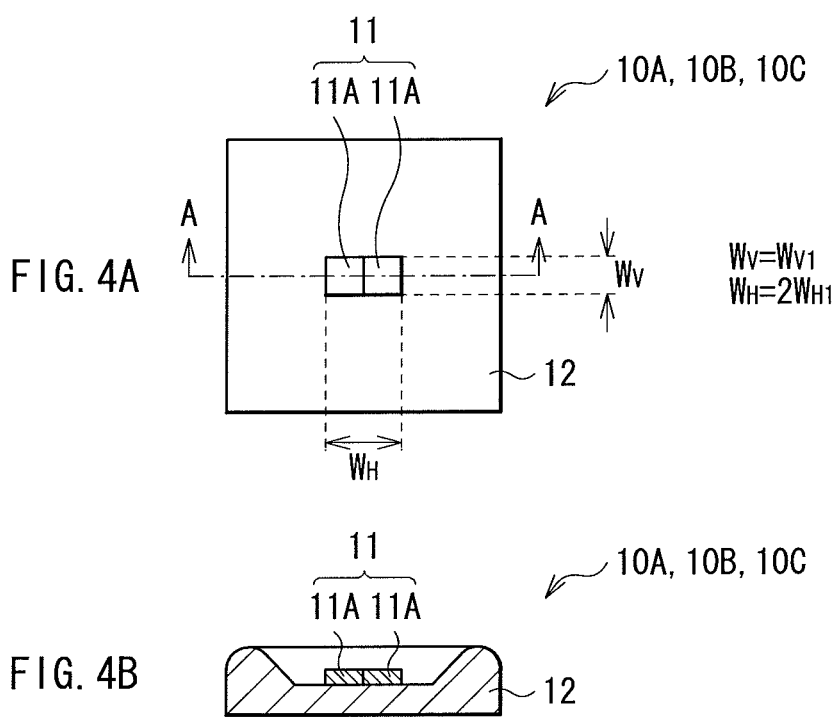

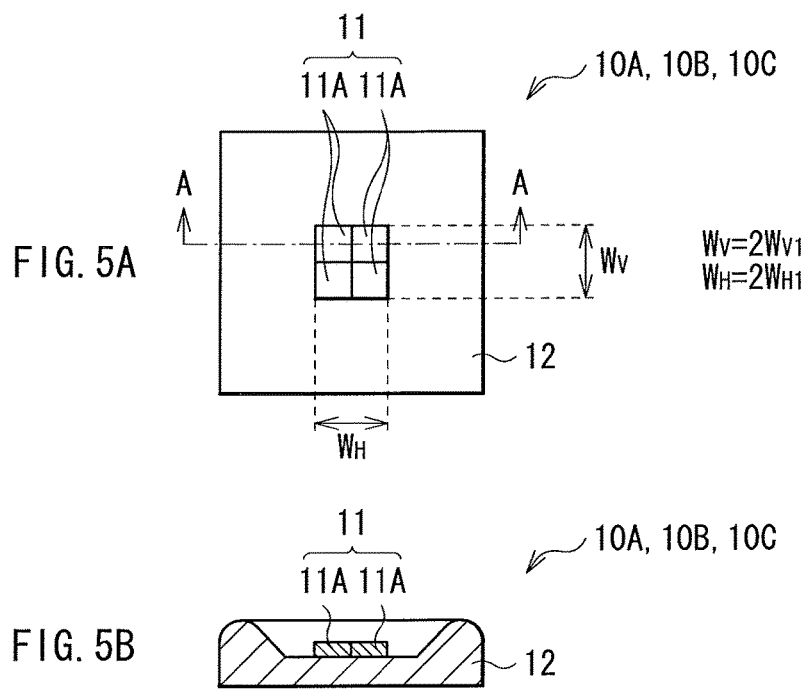

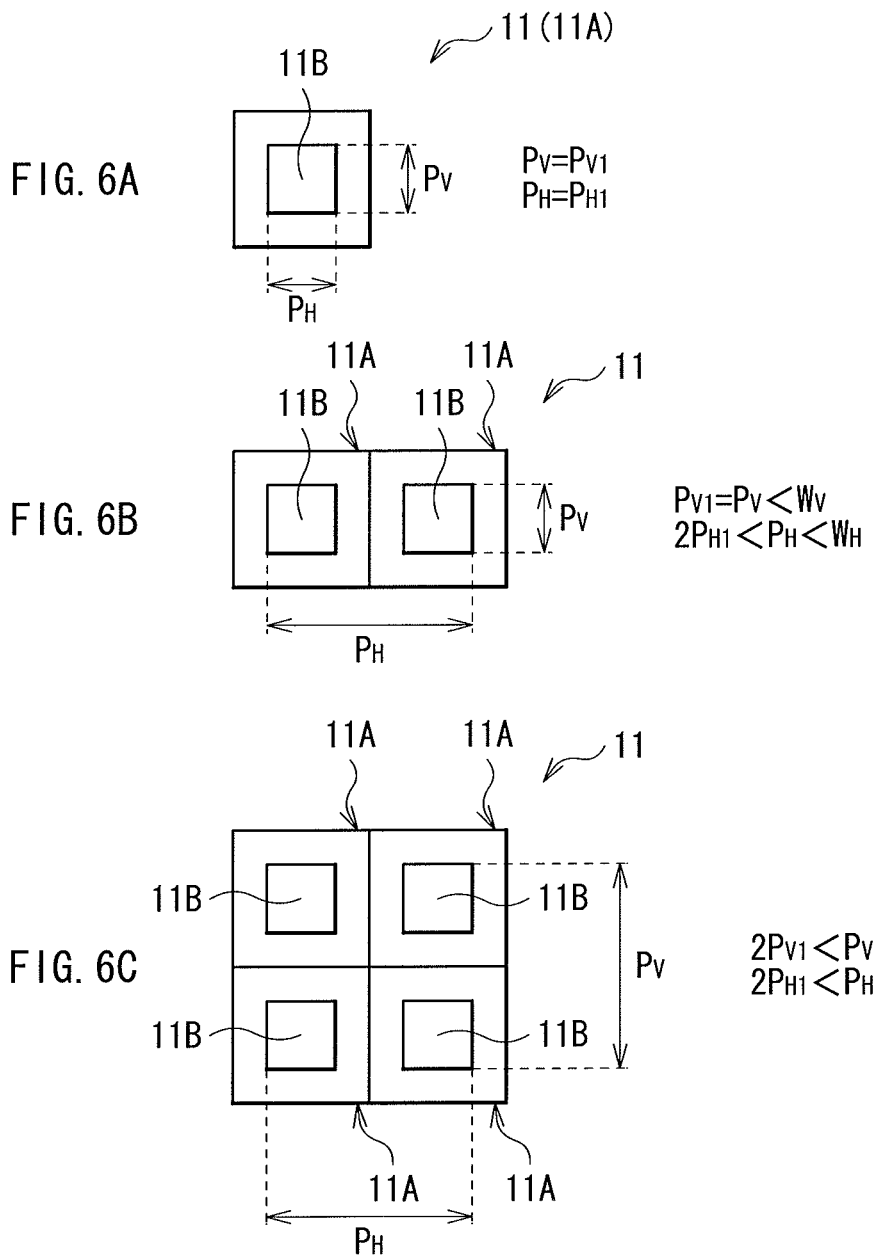

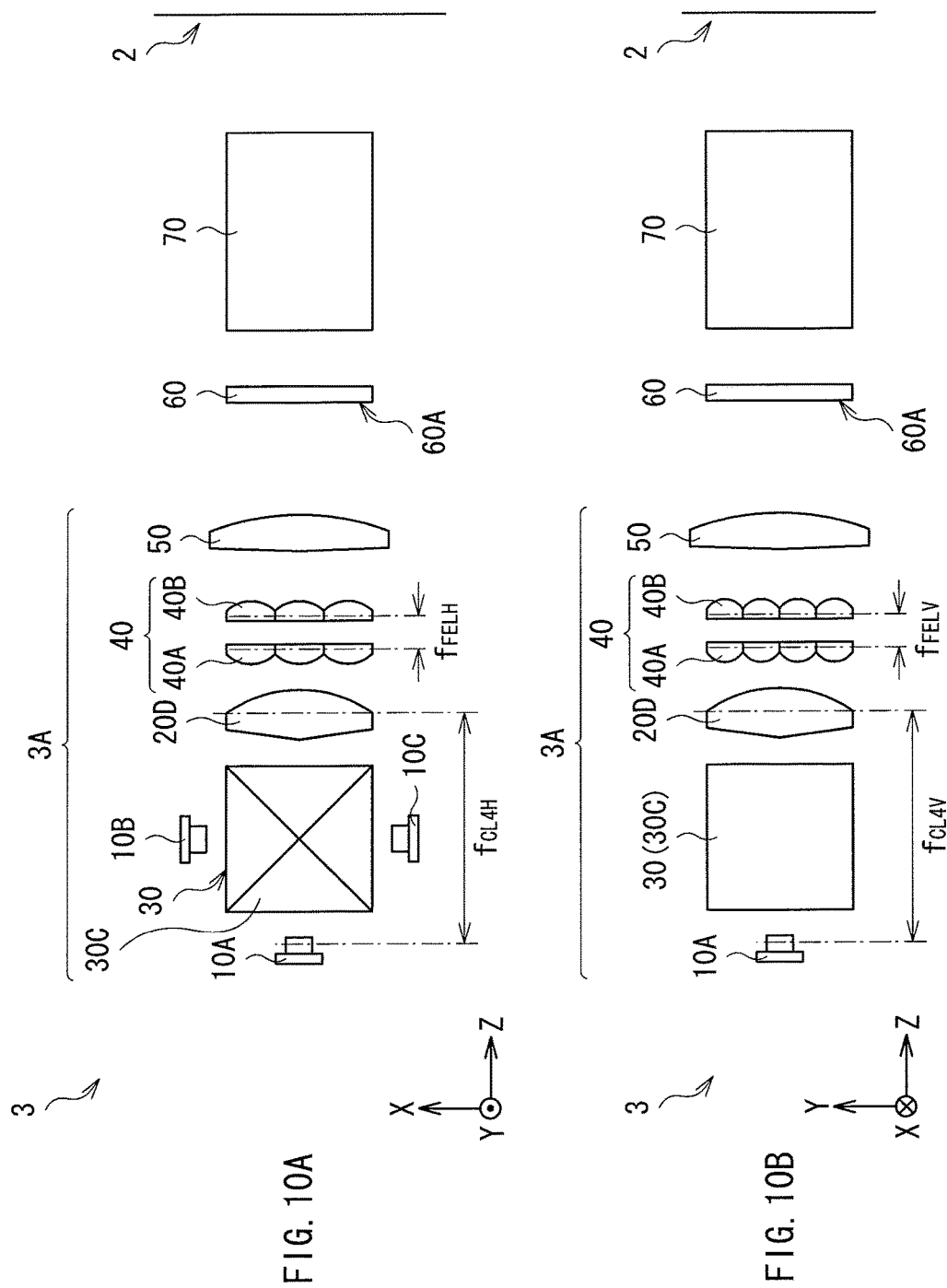

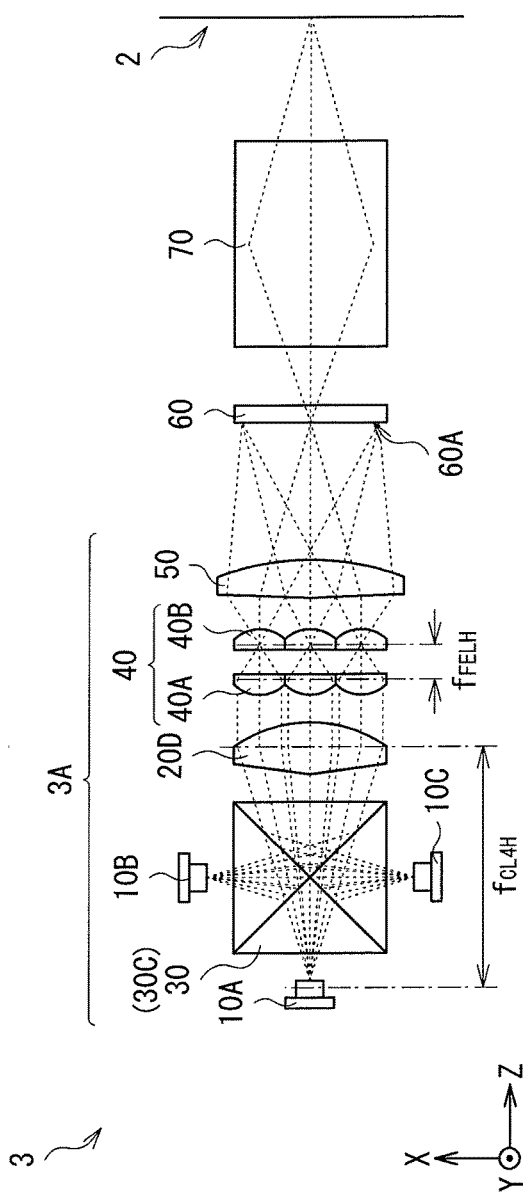
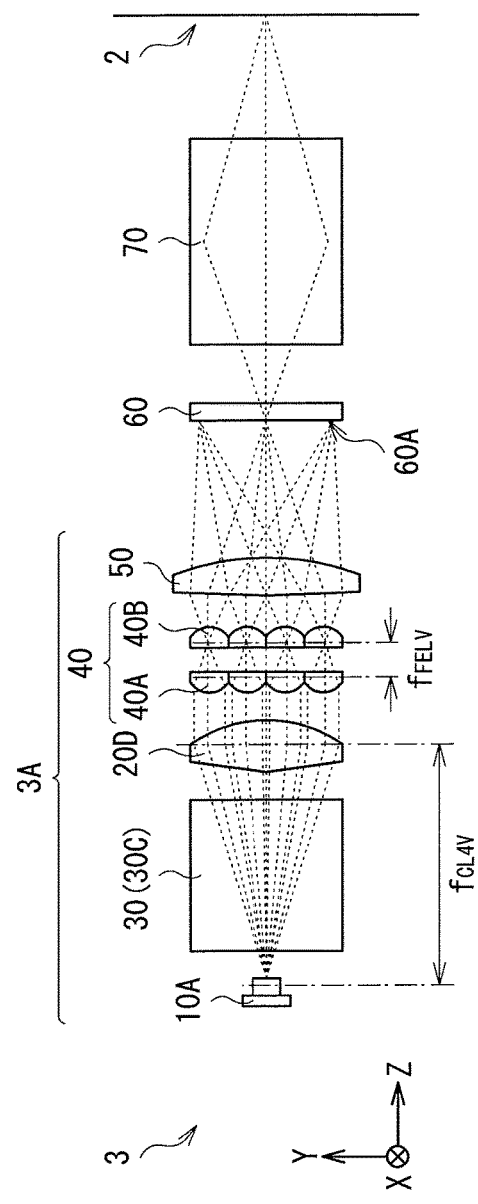
FIG. 11A
FIG. 11B

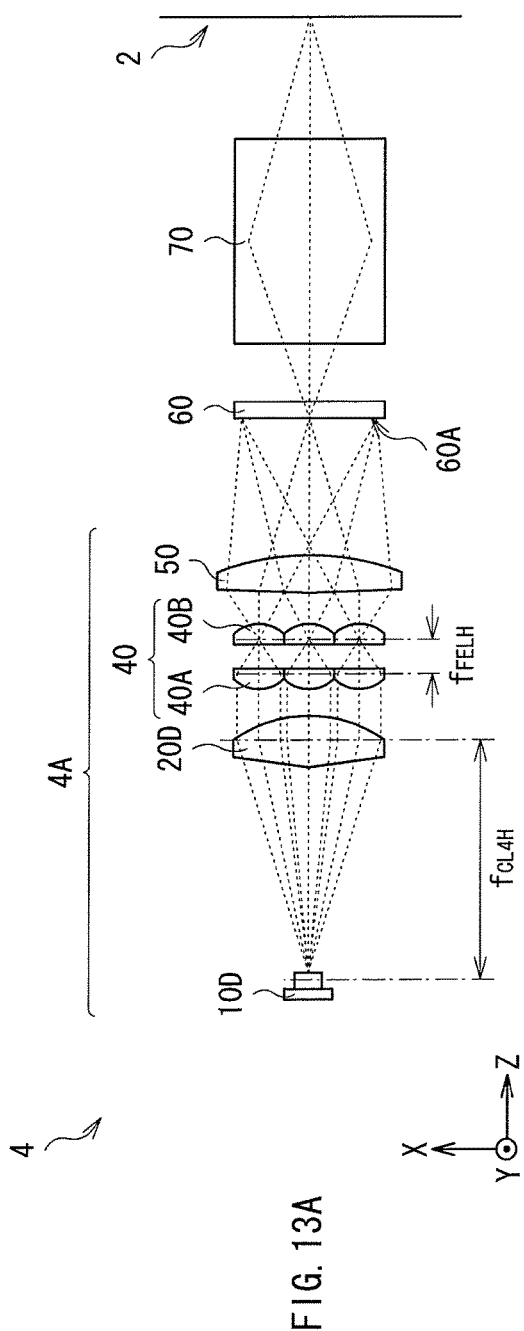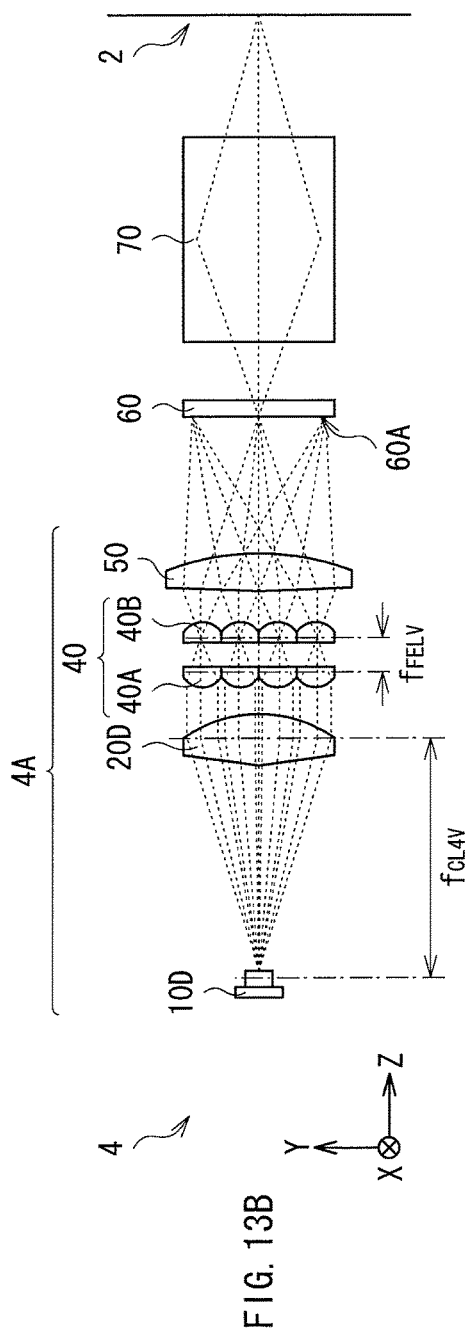
FIG. 13A
FIG. 13B

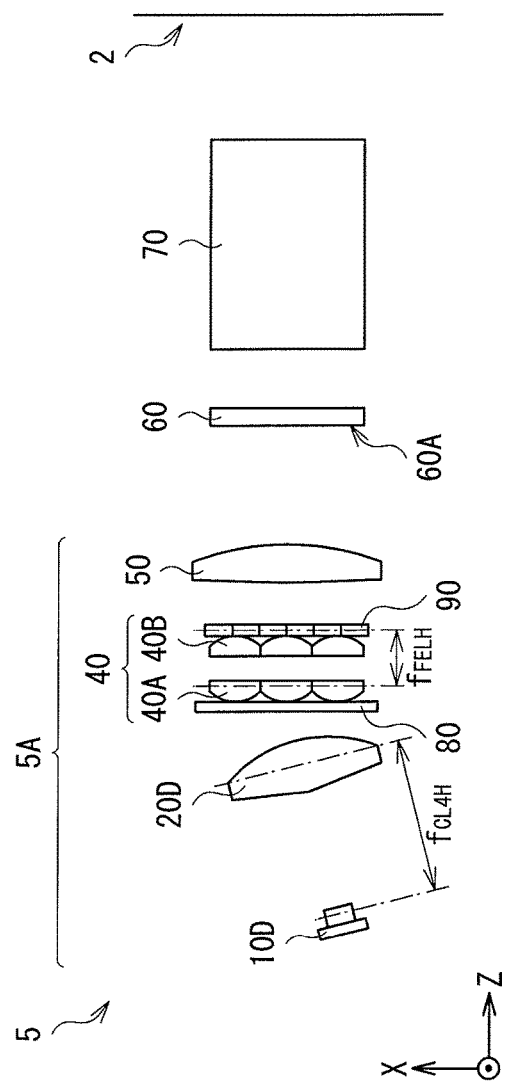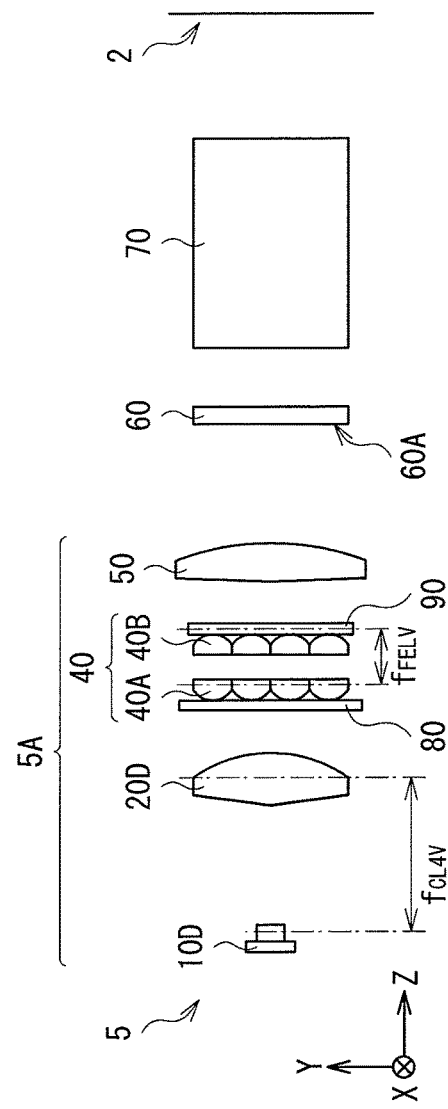
FIG. 14A
FIG. 14B

|  |  | EAXMPLE 1 | EXAMPLE 2 | EXAMPLE 3 |
|---|---|---|---|---|
| ILLUMINATION AREA | H | 4 | 4 | 5.3 |
|  | V | 3 | 2.25 | 3 |
| LIGHT SOURCE SIZE | $W_H$ | 1 | 1 | 1 |
|  | $W_V$ | 1 | 1 | 1 |
| FOCAL LENGTH OF FLY-EYE LENS | $f_{FELH}$ | 3 | 3 | 3 |
|  | $f_{FELV}$ | 3 | 3 | 2 |
| SIZE OF FLY-EYE LENS | $h_{FEL2H}$ | 1 | 1 | 1 |
|  | $h_{FEL2V}$ | 0.75 | 0.5625 | 0.566037736 |
| DIRECTIVITY ANGLE OF LIGHT SOURCE | $\theta_H$ | 50 | 60 | 80 |
|  | $\theta_V$ | 50 | 40 | 55 |
| EFFECTIVE SIZE OF COLLIMATOR | $h_{CLH}$ | 7 | 7 | 7 |
|  | $h_{CLV}$ | 7 | 7 | 6 |
| NA | $NA_H$ | 0.766044443 | 0.866025404 | 0.984807753 |
|  | $NA_V$ | 0.766044443 | 0.64278761 | 0.819152044 |
| CONDITIONAL EXPRESSIONS |  | $3 \leq f_{CLH} \leq 4.6$ | $3 \leq f_{CLH} \leq 4$ | $3 \leq f_{CLH} \leq 3.6$ |
|  |  | $4 \leq f_{CLV} \leq 4.6$ | $5.3 \leq f_{CLV} \leq 5.4$ | $3.5 \leq f_{CLV} \leq 3.7$ |

FIG. 19

|  |  | EXAMPLE 4 |
|---|---|---|
| ILLUMINATION AREA | H | 4 |
|  | V | 3 |
| LIGHT SOURCE SIZE | $W_H$ | 1 |
|  | $W_V$ | 1 |
| FOCAL LENGTH OF FLY-EYE LENS | $f_{FELH}$ | 3 |
|  | $f_{FELV}$ | 3 |
| DIRECTIVITY ANGLE OF LIGHT SOURCE | $\theta_H$ | 50 |
|  | $\theta_V$ | 50 |
| EFFECTIVE SIZE OF COLLIMATOR | $h_{CLH}$ | 10 |
|  | $h_{CLV}$ | 7 |
| NA | $NA_H$ | 0.766044443 |
|  | $NA_V$ | 0.766044443 |
| CONDITIONAL EXPRESSIONS |  | $6 \leq f_{CLH} \leq 6.5$ |
|  |  | $4 \leq f_{CLV} \leq 4.6$ |

FIG. 20

$W_V = W_{V1}$
$W_H \geq 3W_{H1}$ $W_V = W_{V1}$
$W_H \geq 2W_{H1}$ $W_V = W_{V1}$
$W_H = W_{H1}$ $W_V \geqq 3W_{V1}$
$W_H = W_{H1}$ $W_V \geqq 2W_{V1}$
$W_H = W_{H1}$ $W_V = W_{V1}$
$W_H = W_{H1}$

ILLUMINATION UNIT, PROJECTION TYPE DISPLAY UNIT, AND DIRECT VIEW TYPE DISPLAY UNIT

CROSS REFERENCES TO RELATED APPLICATIONS

The present application is a continuation of U.S. patent application Ser. No. 13/246,217, filed Sep. 27, 2011, which application claims priority to Japanese Priority Patent Application JP 2010-229372 filed in the Japan Patent Office on Oct. 12, 2010, the entire content of which is hereby incorporated by reference.

BACKGROUND

This application relates to an illumination unit using a solid-state light-emitting device such as a light-emitting diode (LED), and a projection type display unit and a direct view type display unit including the same.

In recent years, projectors projecting pictures onto a screen have been widely used in homes besides offices. The projector modulates light from a light source with use of a light valve to generate imaging light, and projects the imaging light onto a screen, thereby performing display. Nowadays, palm-sized ultra-compact projectors, mobile phones with a built-in ultra-compact projector, and the like are being introduced.

SUMMARY

Incidentally, as a light source used in a projector, a discharge lamp with high luminance is standard. The discharge lamp, however, is relatively large in size and consumes larger power. Therefore, as a light source alternative to the discharge lamp, solid-state light-emitting devices such as a light-emitting diode (LED), a laser diode (LD), and an organic EL (OLED) has been attracted attention (for example, Japanese Unexamined Patent Application Publication No. 2008-134324). These solid-state light-emitting devices are more advantageous than the discharge lamp in terms of high reliability in addition to the smaller size and the lower consumed power.

In a case where the above-described solid-state light-emitting device is used as a light source of a projector, it is considered that other main components included in the projector are also downsized to further downsize the projector itself. However, when the other main components included in the projector are downsized, light use efficiency is likely to be lowered. Therefore, for example, even if light amount of a light source is increased by increasing the number of the above-described solid-state light-emitting devices, there is a possibility to raise an issue that desired luminance is not obtained due to the lowering of light use efficiency.

It is desirable to provide a small illumination unit with improved light use efficiency. In addition, it is desirable to provide a projection type display unit and a direct view type display unit using such a small illumination unit.

An illumination unit according to an embodiment of the disclosure includes one or more light sources each including a solid-state light-emitting device having a light emission region configured of one or more light-emission spots, one or more traveling-direction angle conversion device each converting a traveling-direction-angle of light entering from the solid-state light-emitting device, and an integrator including a first fly-eye lens having cells which receive light from the traveling-direction angle conversion device and a second fly-eye lens having cells which receive light from the first fly-eye lens. The integrator uniformalizes illumination distribution in a predetermined illumination area which is to be illuminated by light from the traveling-direction angle conversion device. An optical system configured with the traveling-direction angle conversion device and the first and second fly-eye lenses has an optical magnification which allows each of light source images to have a size not exceeding a size of the cell in the second fly-eye lens, the light source images being formed on the second fly-eye lens by the respective cells in the first fly-eye lens.

A projection type display unit according to an embodiment of the disclosure includes: an illumination optical system; a spatial modulation device modulating light from the illumination optical system based on an input picture signal to generate imaging light; and a projection optical system projecting the imaging light generated by the spatial modulation device. The illumination optical system included in the projection type display unit has the same components as those in the above-described illumination unit.

A direct view type display unit according to an embodiment of the disclosure includes: an illumination optical system; a spatial modulation device modulating light from the illumination optical system based on an input picture signal to generate imaging light; a projection optical system projecting the imaging light generated by the spatial modulation device; and a transmissive screen displaying the imaging light projected from the projection optical system. The illumination optical system included in the direct view type display unit has the same components as those in the above-described illumination unit.

In the illumination unit, the projection type display unit, and the direct view type display unit according to the embodiment of the disclosure, an optical magnification of an optical system configured with the traveling-direction angle conversion device and the first and second fly-eye lenses is set so that each light source image formed on the second fly-eye lens by each cell of the first fly-eye lens has a size not exceeding a size of one cell of the second fly-eye lens. Therefore, light entering the second fly-eye lens efficiently reaches the illumination area.

In the illumination unit, the projection type display unit, and the direct view type display unit according to the embodiment of the disclosure, in a case where the solid-state light-emitting device is configured of a single chip which emits light in a predetermined wavelength range or is configured of a plurality of chips which emit light in the same wavelength range or different wavelength ranges, the optical magnification of the optical system configured with the traveling-direction angle conversion device and the first and second fly-eye lenses preferably satisfies the following expression:

$$h = P*m \leq h_{FEL2}$$

where h is a size of the light source image,

P is a size of the light emission region (the size is equal to a size of a light-emission spot of the chip when the solid-state light-emitting device is configured of one chip, and the size is equal to a size of an enclosure which encloses light-emission spots of all the chips with a minimum inner area when the solid-state light-emitting device is configured of a plurality of chips), m is an optical magnification of an optical system configured with the traveling-direction angle conversion device and the first and second fly-eye lenses, and $h_{FEL2}$ is a size of the cell in the second fly-eye lens.

In the illumination unit, the projection type display unit, and the direct view type display unit according to the embodiment of the disclosure, in a case where the traveling-direction angle conversion device converts a traveling-direction angle of light entering from the solid-state light-emitting device to be equal to or close to a traveling-direction angle of parallelized light, a focal length of the traveling-direction angle conversion device and a focal length of each of the first and the second fly-eye lenses preferably satisfy the following expression. At this time, in a case where each cell of the first and second fly-eye lenses has an aspect ratio other than 1, the focal length of the traveling-direction angle conversion device and the focal length of each of the first and second fly-eye lenses are preferably set with the aspect ratio taken into consideration.

$$h = P^*(f_{FEL}/f_{CL}) \leq h_{FEL2}$$

where $f_{FEL}$ is a focal length of each of the first and second fly-eye lenses, and $f_{CL}$ is a focal length of the traveling-direction angle conversion device.

In the illumination unit, the projection type display unit, and the direct view type display unit according to the embodiment of the disclosure, the traveling-direction angle conversion device has a focal length and a numerical aperture which allow light which enters thereto to have a beam size not exceeding a size of the traveling-direction angle conversion device. In this case, the focal length and the numerical aperture of the traveling-direction angle conversion device preferably satisfy the following expression. At this time, in a case where the traveling-direction angle conversion device has an aspect ratio other than 1, the focal length and the numerical aperture of the traveling-direction angle conversion device are preferably set with the aspect ratio taken into consideration.

$$\varphi_{CL} = 2^* f_{CL}^* NA \leq h_{CL}$$

where $\varphi CL$ is a beam size of light entering the traveling-direction angle conversion device, NA is the numerical aperture of the traveling-direction angle conversion device, and $h_{CL}$ is a size of the traveling-direction angle conversion device.

In the illumination unit, the projection type display unit, and the direct view type display unit according to the embodiment of the disclosure, in a case where a plurality of light sources and a plurality of traveling-direction angle conversion devices are provided, each of the light sources may be formed in a manner of a package including the solid-state light-emitting device therein, and each of the traveling-direction angle conversion devices may be arranged for each of the packages. In this case, the illumination unit preferably further includes a light path unifying device unifying light beams, which have passed through the respective traveling-direction angle conversion devices, into a single light path. In addition, in the illumination unit, the projection type display unit, and the direct view type display unit according to the embodiment of the disclosure, in a case where a plurality of light sources and one traveling-direction angle conversion device are provided, each of the light sources may be formed in a manner of a package including the solid-state light-emitting device therein. In this case, the illumination unit preferably further includes a light path unifying device unifying light emitted from each solid-state light-emitting device, into a single light path. Moreover, in the illumination unit, the projection type display unit, and the direct view type display unit according to the embodiment of the disclosure, in a case where one light source and one traveling-direction angle conversion device are provided, the light source may be formed in a manner of a package including the solid-state light-emitting device therein. Furthermore, in the illumination unit, the projection type display unit, and the direct view type display unit according to the embodiment of the disclosure, the chip may be configured with a light emitting diode, an organic EL light-emitting device, or a laser diode. Moreover, in the illumination unit, the projection type display unit, and the direct view type display unit according to the embodiment of the disclosure, a ratio of a vertical magnification factor to a horizontal magnification factor of the traveling-direction angle conversion device may be equal to an inverse of the aspect ratio of each cell in the second fly-eye lenses.

According to the illumination unit, the projection type display unit, and the direct view type display unit of the disclosure, since one light source image is not formed over a plurality of cells, light use efficiency in the illumination unit may be improved.

In addition, in the illumination unit, the projection type display unit, and the direct view type display unit according to the embodiment of the disclosure, in the case where each cell of the first and second fly-eye lenses has an aspect ratio other than 1, when the focal length of the traveling-direction angle conversion device and the focal length of each of the first and second fly-eye lenses are set with the aspect ratio taken into consideration, light use efficiency in the illumination unit may be further improved. Moreover, in the illumination unit, the projection type display unit, and the direct view type display unit according to the embodiment of the disclosure, in a case where the traveling-direction angle conversion device has an aspect ratio other than 1, when the focal length and the numerical aperture of the traveling-direction angle conversion device are set with the aspect ratio taken into consideration, light use efficiency in the illumination unit may be further improved.

Additional features and advantages are described herein, and will be apparent from the following Detailed Description and the figures.

BRIEF DESCRIPTION OF THE FIGURES

FIGS. 1A and 1B are diagrams illustrating a schematic configuration of a projector according to a first embodiment of the disclosure.

FIGS. 2A and 2B are diagrams illustrating an example of light paths in the projector in FIGS. 1A and 1B.

FIGS. 3A and 3B are diagrams illustrating an example of a top surface configuration and a cross-sectional configuration of a light source in FIGS. 1A and 1B.

FIGS. 4A and 4B are diagrams illustrating another example of the top surface configuration and the cross-sectional configuration of the light source in FIGS. 1A and 1B.

FIGS. 5A and 5B are diagrams illustrating still another example of the top surface configuration and the cross-sectional configuration of the light source in FIGS. 1A and 1B.

FIGS. 6A to 6C are diagrams illustrating an example of a light-emission spot of the light source in FIGS. 1A and 1B.

FIGS. 10A and 10B are diagrams illustrating a schematic configuration of a projector according to a second embodiment of the disclosure.

FIGS. 11A and 11B are diagrams illustrating an example of light paths in the projector in FIGS. 10A and 10B.

FIGS. 13A and 13B are diagrams illustrating an example of light paths in the projector in FIGS. 12A and 12B.

FIGS. 14A and 14B are diagrams illustrating a schematic configuration of a projector according to a fourth embodiment of the disclosure.

FIG. 19 is a table illustrating designed values in examples according to the first to third embodiments.

FIG. 20 is a table illustrating designed values in example according to the fourth embodiment.

DETAILED DESCRIPTION

Figure 7A:
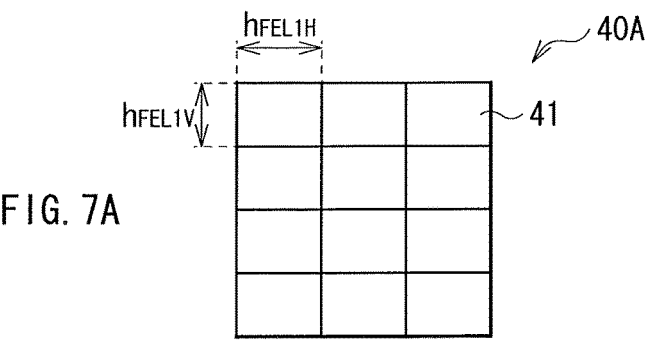
FIGS. 7A and 7B are diagrams illustrating schematic configurations of fly-eye lenses in FIGS. 1A and 1B.

Embodiments of the present application will be described below in detail with reference to the drawings.

1. First embodiment (FIGS. 1A and 1B to FIG. 9)
Example of unifying light beams from each light source into a single light path after parallelization of light with use of coupling lenses 2. Second embodiment (FIGS. 10A and 10B and FIGS. 11A and 11B)
Example of unifying light beams from each light source into a single light path before parallelization of light with use of coupling lenses 3. Third embodiment (FIGS. 12A and 12B and FIGS. 13A and 13B)
Example of emitting light of different wavelength ranges from a single package to eliminate unification of light paths 4. Fourth embodiment (FIGS. 14A and 14B to FIG. 18)
Example in which a polarization splitter and a retardation plate array are provided 5. Examples (FIG. 19 and FIG. 20)

6. Modifications (FIGS. 21A and 21B to FIG. 27)

First Embodiment

Configuration

FIGS. 1A and 1B are diagrams illustrating a schematic configuration of a projector 1 according to a first embodiment of the disclosure. Note that the projector 1 corresponds to a specific example of "a projection type display unit" in the disclosure. FIG. 1A illustrates a configuration example of the projector 1 viewed from above (from y-axis direction), and FIG. 1B illustrates a configuration example of the projector 1 viewed from the side (from x-axis direction). FIGS. 2A and 2B are diagrams illustrating an example of light paths in the projector 1 of FIGS. 1A and 1B. FIG. 2A illustrates an example of light paths in the projector 1 viewed from above (from y-axis direction) and FIG. 2B illustrates an example of light paths in the projector 1 viewed from the side (from x-axis direction).

Typically, y-axis corresponds to a vertical direction, and x-axis corresponds to a horizontal direction, however, y-axis may correspond to a horizontal direction and x-axis may correspond to a vertical direction. Note that in the following description, for convenience, the description will be given on the assumption that the y-axis corresponds to a vertical direction and x-axis corresponds to a horizontal direction. In addition, in the following description, it is assumed that "lateral direction" indicates x-axis direction and "longitudinal direction" indicates y-axis direction.

The projector 1 includes, for example, an illumination optical system 1A, a spatial modulation device 60, and a projection optical system 70. The spatial modulation device 60 modulates light from the illumination optical system 1A based on an input picture signal to generate imaging light. The projection optical system 70 projects the imaging light generated by the spatial modulation device 60 onto a reflective screen 2. Note that the illumination optical system 1A corresponds to a specific example of "an illumination unit".

The illumination optical system 1A supplies light flux illuminating an illumination area 60A (surface to be illuminated) of the spatial modulation device 60. Note that, if necessary, any optical device may be provided in a region through which light of the illumination optical system 1A passes. For example, in a region though which light of the illumination optical system 1A passes, a filter or the like for dimming light other than visible light of the light from the illumination optical system 1A may be provided.

As illustrated in FIGS. 1A and 1B, for example, the illumination optical system 1A includes light sources 10A, 10B, and 10C, coupling lenses (traveling-direction angle conversion devices) 20A, 20B, and 20C, a light path unifying device 30, an integrator 40, and a condenser lens 50. The light path unifying device 30 unifies light beams from the light sources 10A, 10B and 10C, into a single light path, and is configured of, for example, two dichroic mirrors 30A and 30B. The integrator 40 equalizes illumination distribution of light in the illumination area 60A, and is configured of, for example, a pair of fly-eye lenses 40A and 40B. On an optical axis of the light source 10A, the coupling lens 20A, the light path unifying device 30, the integrator 40, and the condenser lens 50 are arranged in this order from the light source 10A side. An optical axis of the light source 10B is orthogonal to the optical axis of the light source 10A in the dichroic mirror 30A, and on the optical axis of the light source 10B, the coupling lens 20B and the dichroic mirror 30A are arranged in this order from the light source 10B side. An optical axis of the light source 10C is orthogonal to the optical axis of the light source 10A in the dichroic mirror 30B, and on the optical axis of the light source 10C, the coupling lens 20C and the dichroic mirror 30B are arranged in this order from the light source 10C side.

Note that in FIGS. 1A and 1B, although exemplified is a case where each components of the projector 1 (except for the light sources 10B and 10C, and the coupling lenses 20B and 20C) are arranged on a line parallel to z-axis, some components of the projector 1 may be arranged on a line not parallel to z-axis. For example, although not illustrated, the illumination optical system 1A may be arranged so that the optical axis of the illumination optical system 1A is along a direction orthogonal to z-axis by rotating the whole illumination optical system 1A by 90 degrees from a state of FIGS. 1A and 1B. However, in this case, an optical device (for example, a mirror) which directs light output from the illumination optical system 1A to the spatial modulation device 60 needs to be provided. Moreover, for example, the light source 10A, the coupling lens 20A, and the light path unifying device 30 may be arranged so that the optical axes of these components are along a direction orthogonal to z-axis by rotating these components by 90 degrees from the state of FIGS. 1A and 1B. However, also in this case, an optical device (for example, a mirror) which directs light output from the light path unifying device 30 to the integrator 40 needs to be provided.

As illustrated in FIGS. 3A and 3B to FIGS. 5A and 5B, for example, the light sources 10A, 10B, and 10C each have a solid-state light-emitting device 11 and a package 12 supporting and covering the solid-state light-emitting device 11. The solid-state light-emitting device 11 emits light from a light emission region which is configured of one or more dot-like light-emission spots, or one or more non-dot-like light-emission spots. The solid-state light-emitting device 11 may be configured of a single chip 11A emitting light of a predetermined wavelength range, for example, as illustrated in FIGS. 3A and 3B, or may be configured of a plurality of chips 11A emitting light of the same wavelength range or with different wavelength ranges, for example, as illustrated in FIGS. 4A and 4B and FIGS. 5A and 5B. In a case where the solid-state light-emitting device 11 is configured of a plurality of chips 11A, the chips 11A are arranged in a lateral line, for example, as illustrated in FIGS. 4A and 4B, or are arranged in lateral and longitudinal directions, that is, in a lattice, for example, as illustrated in FIGS. 5A and 5B. The number of the chips 11A included in the solid-state light-emitting device 11 may be different for each of the light sources 10A, 10B, and 10C, or may be the same for all of the light sources 10A, 10B, and 10C.

In a case where the solid-state light-emitting device 11 is configured of a single chip 11A, the size ($W_V*W_H$) of the solid-state light-emitting device 11 is equal to the size ($W_{V1}*W_{H1}$) of the single chip 11A, for example, as illustrated in FIG. 3A. On the other hand, in a case where the solid-state light-emitting device 11 is configured of a plurality of chips 11A, when all chips 11A are regarded as one group, the size of the solid-state light-emitting device 11 is equal to the size of the group, for example, as illustrated in FIG. 4A and FIG. 5A. In a case where the plurality of chips 11A are arranged in a lateral line, the size ($W_V*W_H$) of the solid-state light-emitting device 11 is $W_{V1}*2W_{H1}$ in the example of FIG. 4A. Moreover, in a case where the plurality of chips 11A are arranged in the lateral and longitudinal directions, that is, in a lattice, the size ($W_V*W_H$) of the solid-state light-emitting device 11 is $2W_{V1}*2W_{H1}$ in the example of FIG. 5A.

The chip 11A is configured with a light-emitting diode (LED), an organic EL light-emitting device (OLED), or a laser diode (LD). All chips 11A included in each of the light sources 10A, 10B, and 10C may be configured with LED, OLED, or LD. In addition, chips 11A included in one or more of the light sources 10A, 10B, and 10C may be configured with LED, and chips 11A included in the other light source(s) may be configured with OLED. Moreover, chips 11A included in one or more of the light sources 10A, 10B, and 10C may be configured with LED, and chips 11A included in the other light source(s) may be configured with LD. Furthermore, chips 11A included in one or more of the light sources 10A, 10B, and 10C may be configured with OLED, and chips 11A included in the other light source(s) may be configured with LD.

The chips 11A included in each of the light sources 10A, 10B, and 10C each emit light of a wavelength range different for each of the light sources 10A, 10B, and 10C, for example. The chips 11A included in the light source 10A emit, for example, light with wavelength of approximately 400 nm to 500 nm (blue light). The chips 11A included in the light source 10B emit, for example, light with wavelength of approximately 500 nm to 600 nm (green light). The chips 11A included in the light source 10C emit, for example, light with wavelength of approximately 600 nm to 700 nm (red light). Incidentally, the chips 11A included in the light source 10A may emit light other than blue light (green light or red light). In addition, the chips 11A included in the light source 10B may emit light other than green light (blue light or red light). Moreover, the chips 11A included in the light source 10C may emit light other than red light (green light or blue light).

As illustrated in FIGS. 3A and 3B to FIGS. 6A to 6C, for example, the chip 11A has a light-emission spot 11B with a size ($P_{V1}*P_{H1}$) smaller than the size ($W_{v1}*W_{H1}$) of the chip 11A. The light-emission spot 11B corresponds to a region (light emission region) from which the chip 11A emits light when a current is injected into the chip 11A to drive the chip 11A. In a case where the chip 11A is configured of LED or OLED, the light-emission spot 11B has a non-dot-like shape (a planar shape), and in a case where the chip 11A is configured of LD, the light-emission spot 11B has a dot-like shape smaller than the light-emission spot 11B in the case of LED or OLED.

In the case where the solid-state light-emitting device 11 is configured of a single chip 11A, the number of the light-emission spots 11B is, for example, one as illustrated in FIG. 6A. On the other hand, in the case where the solid-state light-emitting device 11 is configured of a plurality of chips 11A, the number of the light-emission spots 11B is equal to the number of the chips 11A, for example, as illustrated in FIGS. 6B and 6C. Herein, in the case where the solid-state light-emitting device 11 is configured of a single chip 11A, the size ($P_V*P_H$) of the light emission region of the solid-state light-emitting device 11 is equal to the size ($P_{V1}*P_{H1}$) of the light-emission spot 11B. On the other hand, in the case where the solid-state light-emitting device 11 is configured of a plurality of chips 11A, the size ($P_V*P_H$) of the light emission region as the solid-state light-emitting device 11 is equal to a size of an enclosure which encloses the light-emission spots 11B of all chips 11A with a minimum inner area. In the case where the plurality of chips 11A are arranged in a lateral line, the size ($P_V*P_H$) of the light emission region is larger than $P_{V1}*2P_{H1}$ but smaller than $W_V*W_H$ in the example of FIG. 6B. In addition, in the case where the plurality of chips 11A are arranged in lateral and longitudinal directions, i.e., in a lattice, the size ($P_V*P_H$) of the light emission region is larger than $2P_{V1}*2P_{H1}$ but smaller than $W_V*W_H$ in the example of FIG. 6C.

As illustrated in FIGS. 2A and 2B, for example, the coupling lens 20A substantially parallelizes light emitted from the light source 10A, and converts a traveling-direction angle ($\theta_H$, $\theta_V$) of the light emitted from the light source 10A to be equal to or close to a traveling-direction angle of parallelized light. The coupling lens 20A is disposed on a position where light within the traveling-direction angle contained in the light emitted from the light source 10A enters the coupling lens 20A. As illustrated in FIGS. 2A and 2B, for example, the coupling lens 20B substantially parallelizes light emitted from the light source 10B, and converts a traveling-direction angle ($\theta_H$, $\theta_V$) of the light emitted from the light source 10B to be equal to or close to a traveling-direction angle of parallelized light. The coupling lens 20B is disposed on a position allowing light within the traveling-direction angle of light emitted from the light source 10B to enter the coupling lens 20B. As illustrated in FIGS. 2A and 2B, for example, the coupling lens 20C substantially parallelizes light emitted from the light source 10C, and converts a traveling-direction angle ($\theta_H$, $\theta_V$) of the light emitted from the light source 10C to be equal to or close to a traveling-direction angle of parallelized light. The coupling lens 20C is disposed on a position allowing light within the traveling-direction angle of light emitted from the light source 10C to enter the coupling lens 20C. In other words, the coupling lenses 20A, 20B, and 20C are arranged one to one for the light sources 10A, 10B, and 10C (for each package). Note that each of the coupling lenses 20A, 20B, and 20C may be configured of one or more lenses.

The dichroic mirrors 30A and 30B each include a mirror with wavelength selectivity. Incidentally, for example, the above-described mirror is configured by depositing a multilayer interference film. As illustrated in FIGS. 2A and 2B, for example, the dichroic mirror 30A allows light entering from the back side of the mirror (light entering from the light source 10A side) to pass therethrough to the front side of the mirror, and reflects light entering from the front side of the mirror (light entering from the light source 10B side) by the mirror. On the other hand, the dichroic mirror 30B allows light entering from the back side of the mirror (light of the light sources 10A and 10B entering from the dichroic mirror 30A side) to pass therethrough to the front side of the mirror, and reflects light entering from the front side of the mirror (light entering from the light source 10C side) by the mirror as illustrated in FIGS. 2A, and 2B, for example. Therefore, the light path unifying device 30 unifies individual light fluxes emitted from the light sources 10A, 10B, and 10C to generate a single light flux.

Each of the fly-eye lenses 40A and 40B is configured of a plurality of lenses (cells) arranged in a predetermined arrangement pattern (in this case, in a matrix of vertical*horizontal=4*3). Each of the cells 42 included in the fly-eye lens 40B is arranged to face each cell 41 of the fly-eye lens 40A. The fly-eye lens 40A is disposed on a focal position (or substantially on a focal position) of the fly-eye lens 40B, and the fly-eye lens 40B is disposed on a focal position (or substantially on a focal position) of the fly-eye lens 40A. Accordingly, in the integrator 40, light fluxes divided by the fly-eye lens 40A is each focused substantially on a lens surface of the image side of the fly-eye lens 40B, thereby forming secondary light source planes (light source images) on the focal point. The secondary light source planes are located on positions of a plane conjugate to an entrance pupil of the projection optical system 70. The secondary light source planes are, however, not necessarily located strictly on the positions of a plane conjugate to an entrance pupil of the projection optical system 70, and may be located within an acceptable region in design. The fly-eye lenses 40A and 40B may be integrally formed.

Light fluxes emitted from the light sources 10A, 10B, and 10C generally show non-uniform intensity distribution on a plane perpendicular to the traveling direction of light fluxes. Therefore, if the light fluxes are directed as it is to the illumination area 60A (surface to be illuminated), illumination distribution in the illumination area 60A is non-uniform. However, as described above, when the light fluxes emitted from the light sources 10A, 10B, and 10C are divided into a plurality of light fluxes by the integrator 40 and then guided to the illumination area 60A in a superimposed manner, the illumination distribution in the illumination area 60A is allowed to be uniform.

The condenser lens 50 collects light fluxes from multiple light sources formed by the integrator 40 to illuminate the illumination area 60A in a superimposed manner. The spatial modulation device 60 modulates light fluxes from the illumination optical system 1A two-dimensionally, based on a color image signal corresponding to wavelength component of each of the light sources 10A, 10B, and 10C, and thus generates imaging light. As illustrated in FIGS. 2A and 2B, for example, the spatial modulation device 60 is a transmissive device, and is configured of, for example, a transmissive liquid crystal panel. Incidentally, although not illustrated, the spatial modulation device 60 may be configured of a reflective device such as a reflective liquid crystal panel and a digital micro mirror device. However, in such a case, light reflected by the spatial modulation device 60 needs to enter the projection optical system 70.

Next, features of the projector 1 will be described.

Feature 1

Figure 9:
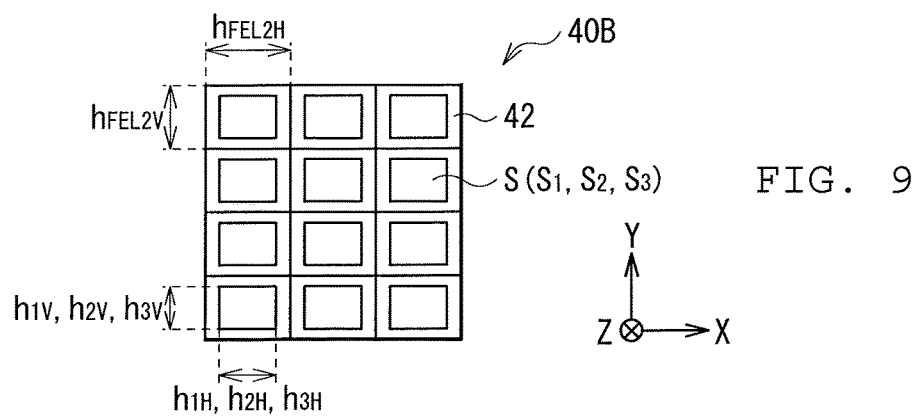
FIG. 9 is a schematic diagram illustrating an example of light source images appearing in a fly-eye lens disposed backward in the projector in FIGS. 1A and 1B.

In the embodiment, the focal length of each of the coupling lenses 20A, 20B, and 20C, and the focal length of each of the fly-eye lenses 40A and 40B are set so that each light source image S formed on the fly-eye lens 40B by each cell 41 of the fly-eye lens 40A has a size not exceeding the size of one cell 42 of the fly-eye lens 40B. Following expressions represent the relationship. In addition, the relationship is schematically illustrated in FIG. 9. In FIG. 9, a case where each cell of the fly-eye lenses 40A and 40B has an aspect ratio other than 1 is illustrated. Incidentally, FIG. 9 will be described in detail later.

$$h_1 = P_1 * (f_{FEL}/f_{CL1}) \leq h_{FEL2} \quad (1)$$

$$h_2 = P_2 * (f_{FEL}/f_{CL2}) \leq h_{FEL2} \quad (2)$$

$$h_3 = P_3 * (fFEL/fCL3) \leq hFEL2 \quad (3)$$

where $h_1$ is a size of the light source image S (a light source image $S_1$) formed by light of the light source 10A, $h_2$ is a size of the light source image S (a light source image $S_2$) formed by light of the light source 10B, $h_3$ is a size of the light source image S (a light source image $S_3$) formed by light of the light source 10C, $P_1$ is a size of a light emission region of the solid-state light-emitting device 11 included in the light source 10A, $P_2$ is a size of a light emission region of the solid-state light-emitting device 11 included in the light source 10B, $P_3$ is a size of a light emission region of the solid-state light-emitting device 11 included in the light source 10C, $f_{FEL}$ is a focal length of each of the fly-eye lenses 40A and 40B, $f_{CL1}$ is a focal length of the coupling lens 20A, $f_{CL2}$ is a focal length of the coupling lens 20B, $f_{CL3}$ is a focal length of the coupling lens 20C, and $h_{FEL2}$ is a size of one cell 42 of the fly-eye lens 40B.

Note that in the case where the solid-state light-emitting device 11 included in the light source 10A is configured of a single chip 11A, $P_1$ is equal to a size of the light-emission spot 11B of the chip 11A. Likewise, in the case where the solid-state light-emitting device 11 included in the light source 10B is configured of a single chip 11A, $P_2$ is equal to a size of the light-emission spot 11B of the chip 11A, and in the case where the solid-state light-emitting device 11 included in the light source 10C is configured of a single chip 11A, $P_3$ is equal to a size of the light-emission spot 11B of the chip 11A. In the case where the solid-state light-emitting device 11 included in the light source 10A is configured of a plurality of chips 11A, $P_1$ is equal to a size of an enclosure which encloses the light-emission spots 11B of all chips 11A with a minimum inner area. Likewise, in the case where the solid-state light-emitting device 11 included in the light source 10B is configured of a plurality of chips 11A, $P_2$ is equal to a size of an enclosure which encloses the light-emission spots 11B of all chips 11A with a minimum inner area. In the case where the solid-state light-emitting device 11 included in the light source 10C is configured of a plurality of chips 11A, $P_3$ is equal to a size of an enclosure which encloses the light-emission spots 11B of all chips 11A with a minimum inner area. In addition, in a case where the coupling lens 20A is configured of a plurality of lenses, $f_{CL1}$ is a combined focal length of the lenses. Likewise, in a case where the coupling lens 20B is configured of a plurality of lenses, $f_{CL2}$ is a combined focal length of the lenses. In a case where the coupling lens 20C is configured of a plurality of lenses, $f_{CL3}$ is a combined focal length of the lenses.

As expressions substantially equivalent to the above-described expressions (1) to (3), the following expressions (4) to (6) are cited. The expressions (4) to (6) are especially advantageous in the case where the size of the light emission region of the solid-state light-emitting device 11 is substantially equal to the size of the solid-state light-emitting device 11.

$$h_1 = W_1 * (f_{FEL}/f_{CL1}) \leq h_{FEL2} \quad (4)$$

$$h_2 = W_2 * (f_{FEL}/f_{CL2}) \leq h_{FEL2} \quad (5)$$

$$h_3 = W_3 * (f_{FEL}/f_{CL3}) \leq h_{FEL2} \quad (6)$$

where $W_1$ is a size of the solid-state light-emitting device 11 included in the light source 10A, $W_2$ is a size of the solid-state light-emitting device 11 included in the light source 10B, and $W_3$ is a size of the solid-state light-emitting device 11 included in the light source 10C.

Note that in the case where the solid-state light-emitting device 11 is configured of a single chip 11A, W is equal to the size of the chip 11A. In addition, in a case where the solid-state light-emitting device 11 is configured of a plurality of chips 11A which are regarded as a single chip, W is equal to the size of the single chip.

Figure 7B:
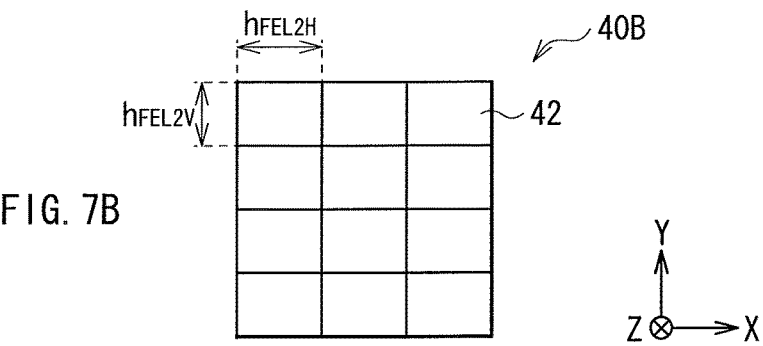
Figure 8:
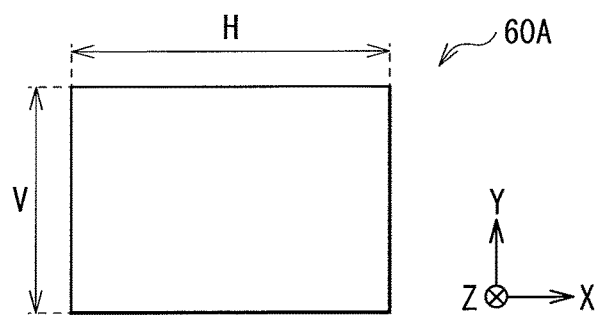
FIG. 8 is a schematic diagram for describing a size of an illumination area in FIGS. 1A and 1B.

Incidentally, in the embodiment, for example, as illustrated in FIGS. 7A and 7B, in a case where each of the cells 41 and 42 of the fly-eye lenses 40A and 40B has an aspect ratio other than 1, it is preferable that the focal length of each of the coupling lenses 20A, 20B, and 20C and the focal length of each of the fly-eye lenses 40A and 40B satisfy the following six relational expressions. Moreover, it is preferable that the ratio of horizontal focal length to vertical focal length of each of the coupling lenses 20A, 20B, and 20C ($f_{CL1H}/f_{CL1V}$, $f_{CL2H}/f_{CL2V}$, and $f_{CL3H}/f_{CL3V}$) (anomorphic ratio) be equal to the inverse ($h_{FEL2V}/h_{FEL2H}$) of the aspect ratio of the size of each cell 42 of the fly-eye lens 40B, and the illumination optical system 1A be an anomorphic optical system. For example, when each cell 42 of the fly-eye lens 40B is long in a first direction (for example, in a lateral direction), as the coupling lenses 20A, 20B, and 20C, the lenses whose focal lengths $f_{CL1V}$, $f_{CL2V}$, and $f_{CL3V}$ are longer than the focal lengths $f_{CL1H}$, $f_{CL2H}$, and $f_{CL3H}$, respectively, are used. FIG. 9 schematically illustrates the following expressions (7) to (12).

$$h_{1H} = P_{1H} * (f_{FEL1H}/f_{CL1H}) \leq h_{FEL2H} \quad (7)$$

$$h_{2H} = P_{2H} * (f_{FELH}/f_{CL2H}) \leq h_{FEL2H} \quad (8)$$

$$h_{3H} = P_{3H} * (f_{FELH}/f_{CL3H}) \leq h_{FEL2H} \quad (9)$$

$$h_{1V} = P_{1V} * (f_{FELV}/f_{CL1V}) \leq h_{FEL2V} \quad (10)$$

$$h_{2V} = P_{2V} * (f_{FELV}/f_{CL2V}) \leq h_{FEL2V} \quad (11)$$

$$h_{3V} = P_{3V} * (f_{FELV}/f_{CL3V}) \leq h_{FEL2V} \quad (12)$$

where $h_{1H}$ is a size in a first direction (for example, in a lateral direction) of the light source image S (the light source image $S_1$) formed by light of the light source 10A, $h_{2H}$ is a size in the first direction (for example, in the lateral direction) of the light source image S (the light source image $S_2$) formed by light of the light source 10B, $h_{3H}$ is a size in the first direction (for example, in the lateral direction) of the light source image S (the light source image $S_3$) formed by light of the light source 10C, $h_{1V}$ is a size in a second direction orthogonal to the first direction (for example, in a longitudinal direction), of the light source image S (the light source image $S_1$) formed by light of the light source 10A, $h_{2V}$ is a size in the second direction orthogonal to the first direction (for example, in the longitudinal direction), of the light source image S (the light source image $S_2$) formed by light of the light source 10B, $h_{3V}$ is a size in the second direction orthogonal to the first direction (for example, in the longitudinal direction), of the light source image S (the light source image $S_3$) formed by light of the light source 10C, $P_{1H}$ is a size in the first direction or a direction corresponding thereto, of the light emission region of the solid-state light-emitting device 11 included in the light source 10A, $P_{2H}$ is a size in the first direction or a direction corresponding thereto, of the light emission region of the solid-state light-emitting device 11 included in the light source 10B, $P_{3H}$ is a size in the first direction or a direction corresponding thereto, of the light emission region of the solid-state light-emitting device 11 included in the light source 10C, $P_{1V}$ is a size in the second direction or a direction corresponding thereto, of the light emission region of the solid-state light-emitting device 11 included in the light source 10A, $P_{2V}$ is a size in the second direction or a direction corresponding thereto, of the light emission region of the solid-state light-emitting device 11 included in the light source 10B, $P_{3V}$ is a size in the second direction or a direction corresponding thereto, of the light emission region of the solid-state light-emitting device 11 included in the light source 10C, $f_{FELH}$ is a focal length in the first direction of each of the fly-eye lenses 40A and 40B, $f_{FELV}$ is a focal length in the second direction of each of the fly-eye lenses 40A and 40B, $f_{CL1H}$ is a focal length in the first direction or a direction corresponding thereto, of the coupling lens 20A, $f_{CL2H}$ is a focal length in the first direction or a direction corresponding thereto, of the coupling lens 20B, $f_{CL3H}$ is a focal length in the first direction or a direction corresponding thereto, of the coupling lens 20C, $f_{CL1V}$ is a focal length in the second direction or a direction corresponding thereto, of the coupling lens 20A, $f_{CL2V}$ is a focal length in the second direction or a direction corresponding thereto, of the coupling lens 20B, $f_{CL3V}$ is a focal length in the second direction or a direction corresponding thereto, of the coupling lens 20C, $h_{FEL2H}$ is a size in the first direction of one cell 42 of the fly-eye lens 40B, and $h_{FEL2V}$ is a size in the second direction of one cell 42 of the fly-eye lens 40B.

Herein, "a first direction or a direction corresponding thereto" indicates the first direction in a case where the light sources 10A, 10B, and 10C and the coupling lenses 20A, 20B, and 20C are arranged on an optical axis of the integrator 40. In addition, "a first direction or a direction corresponding thereto" indicates the direction corresponding to the first direction because of layout of optical devices arranged on a light path from the light sources 10A, 10B, and 10C to the integrator 40, in a case where the light sources 10A, 10B, and 10C and the coupling lenses 20A, 20B, and 20C are arranged on a light path away from the optical axis of the integrator 40.

Moreover, "a second direction or a direction corresponding thereto" indicates the second direction in a case where the light sources 10A, 10B, and 10C and the coupling lenses 20A, 20B, and 20C are arranged on the optical axis of the integrator 40. Furthermore, "a second direction or a direction corresponding thereto" indicates the direction corresponding to the second direction because of the layout of the optical devices arranged on the light path from the light sources 10A, 10B, and 10C to the integrator 40, in the case where the light sources 10A, 10B, and 10C and the coupling lenses 20A, 20B, and 20C are arranged on a light path away from the optical axis of the integrator 40.

Note that in the case where the solid-state light-emitting device 11 included in the light source 10A is configured of a single chip 11A, $P_{1H}$ is equal to a size in the first direction or a direction corresponding thereto, of the light-emission spot 11B of the chip 11A. Likewise, in the case where the solid-state light-emitting device 11 included in the light source 10B is configured of a single chip 11A, $P_{2H}$ is equal to a size in the first direction or a direction corresponding thereto, of the light-emission spot 11B of the chip 11A. In the case where the solid-state light-emitting device 11 included in the light source 10C is configured of a single chip 11A, $P_{3H}$ is equal to a size in the first direction or a direction corresponding thereto, of the light-emission spot 11B of the chip 11A. In addition, in the case where the solid-state light-emitting device 11 included in the light source 10A is configured of a plurality of chips 11A, $P_{1H}$ is equal to a size in the first direction or a direction corresponding thereto, of an enclosure which encloses the light-emission spots 11B of all chips 11A with a minimum inner area. Likewise, in the case where the solid-state light-emitting device 11 included in the light source 10B is configured of a plurality of chips 11A, $P_{2H}$ is equal to a size in the first direction or a direction corresponding thereto, of an enclosure which encloses the light-emission spots 11B of all chips 11A with a minimum inner area. In the case where the solid-state light-emitting device 11 included in the light source 10C is configured of a plurality of chips 11A, $P_{3H}$ is equal to a size in a first direction or a direction corresponding thereto, of an enclosure which encloses the light-emission spots 11B of all chips 11A with a minimum inner area. On the other hand, in the case where the solid-state light-emitting device 11 included in the light source 10A is configured of a single chip 11A, $P_{1V}$ is equal to a size in the second direction or a direction corresponding thereto, of the light-emission spot 11B of the chip 11A. Likewise, in the case where the solid-state light-emitting device 11 included in the light source 10B is configured of a single chip 11A, $P_{2V}$ is equal to a size in the second direction or a direction corresponding thereto, of the light-emission spot 11B of the chip 11A. In the case where the solid-state light-emitting device 11 included in the light source 10C is configured of a single chip 11A, $P_{3V}$ is equal to a size in the second direction or a direction corresponding thereto, of the light-emission spot 11B of the chip 11A. Moreover, in the case where the solid-state light-emitting device 11 included in the light source 10A is configured of a plurality of chips 11A, $P_{1V}$ is equal to a size in the second direction or a direction corresponding thereto, of an enclosure which encloses the light-emission spots 11B of all chips 11A with a minimum inner area. Likewise, in the case where the solid-state light-emitting device 11 included in the light source 10B is configured of a plurality of chips 11A, $P_{2V}$ is equal to a size in the second direction or a direction corresponding thereto, of an enclosure which encloses the light-emission spots 11B of all chips 11A with a minimum inner area. In the case where the solid-state light-emitting device 11 included in the light source 10C is configured of a plurality of chips 11A, $P_{3V}$ is equal to a size in the second direction or a direction corresponding thereto, of an enclosure which encloses the light-emission spots 11B of all chips 11A with a minimum inner area.

Moreover, in the embodiment, when each of the cells 41 and 42 of the fly-eye lenses 40A and 40B has an aspect ratio other than 1, it is preferable that an aspect ratio of a size of each cell 41 of the fly-eye lens 40A and an aspect ratio of the illumination area 60A satisfy the following relational expression. In this case, the aspect ratio H/V of the illumination area 60A has a correlation with resolution of the spatial modulation device 60, and for example, when the resolution of the spatial modulation device 60 is VGA (640*480), the aspect ratio H/V is 640/480, and for example, when the resolution of the spatial modulation device 60 is WVGA (800*480), the aspect ratio H/V is 800/480.

$$h_{FEL1H}/h_{FEL1V}=H/V \quad (13)$$

where $h_{FEL1H}$ is a size in the first direction of one cell of the fly-eye lens 40A, $h_{FEL1V}$ is a size in the second direction of one cell of the fly-eye lens 40A, H is a size in the first direction of the illumination area 60A, and V is a size in the second direction of the illumination area 60A.

(Feature 2)

Moreover, in the embodiment, the focal length and the numerical aperture of each of the coupling lenses 20A, 20B, and 20C are set so that light entering the coupling lenses 20A, 20B, and 20C has a beam size not exceeding the size of the coupling lenses 20A, 20B, and 20C, respectively. The relationship is expressed by the following expressions.

$$\varphi_{CL1}=2*f_{CL1}*NA_1 \le h_{CL1} \quad (14)$$

$$\varphi_{CL2}=2*f_{CL2}*NA_2 \le h_{CL2} \quad (15)$$

$$\varphi_{CL3}=2*f_{CL3}*NA_3 \le h_{CL3} \quad (16)$$

where $\varphi_{CL1}$ is a beam size of light entering the coupling lens 20A, $\varphi_{CL2}$ is a beam size of light entering the coupling lens 20B, $\varphi_{CL3}$ is a beam size of light entering the coupling lens 20C, $NA_1$ is the numerical aperture of the coupling lens 20A,
$NA_2$ is the numerical aperture of the coupling lens 20B,
$NA_3$ is the numerical aperture of the coupling lens 20C,
$h_{CL1}$ is a size of the coupling lens 20A,
$h_{CL2}$ is a size of the coupling lens 20B, and
$h_{CL3}$ is a size of the coupling lens 20C.

Incidentally, in the embodiment, when the coupling lenses 20A, 20B, and 20C each have an aspect ratio other than 1, it is preferable that the focal length and the numerical aperture of each of the coupling lenses 20A, 20B, and 20C satisfy the following two relational expressions.

$$\varphi_{CL1H}=2*f_{CL1H}*NA_{1H} \le h_{CL1H} \quad (17)$$

$$\varphi_{CL2H}=2*f_{CL2H}*NA_{2H} \le h_{CL2H} \quad (18)$$

$$\varphi_{CL3H}=2*f_{CL3H}*NA_{3H} \le h_{CL3H} \quad (19)$$

$$\varphi_{CL1V}=2*f_{CL1V}*NA_{1V} \le h_{CL1V} \quad (20)$$

$$\varphi_{CL2V}=2*f_{CL2V}*NA_{2V} \le h_{CL2V} \quad (21)$$

$$\varphi_{CL3V}=2*f_{CL3V}*NA_{3V} \le h_{CL3v} \quad (22)$$

where $\varphi_{CL1H}$ is a beam size in the first direction (for example, in the lateral direction) or a direction corresponding thereto, of light entering the coupling lens 20A, $\varphi_{CL2H}$ is a beam size in the first direction (for example, in the lateral direction) or a direction corresponding thereto, of light entering the coupling lens 20B, $\varphi_{CL3H}$ is a beam size in the first direction (for example, in the lateral direction) or a direction corresponding thereto, of light entering the coupling lens 20C, $\varphi_{CL1V}$ is a beam size in the second direction (for example, in the longitudinal direction) or a direction corresponding thereto, of light entering the coupling lens 20A, $\varphi_{CL2V}$ is a beam size in the second direction (for example, in the longitudinal direction) or a direction corresponding thereto, of light entering the coupling lens 20B, $\varphi_{CL3V}$ is a beam size in the second direction (for example, in the longitudinal direction) or a direction corresponding thereto, of light entering the coupling lens 20C, $NA_{1H}$ is the numerical aperture in the first direction or a direction corresponding thereto, of the coupling lens 20A, $NA_{2H}$ is the numerical aperture in the first direction or a direction corresponding thereto, of the coupling lens 20B, $NA_{3H}$ is the numerical aperture in the first direction or a direction corresponding thereto, of the coupling lens 20C, $NA_{1V}$ is the numerical aperture in the second direction or a direction corresponding thereto, of the coupling lens 20A, $NA_{2V}$ is the numerical aperture in the second direction or a direction corresponding thereto, of the coupling lens 20B, $NA_{3V}$ is the numerical aperture in the second direction or a direction corresponding thereto, of the coupling lens 20C, $h_{CL1H}$ is a size in the first direction or a direction corresponding thereto, of the coupling lens 20A, $h_{CL2H}$ is a size in the first direction or a direction corresponding thereto, of the coupling lens 20B, $h_{CL3H}$ is a size in the first direction or a direction corresponding thereto, of the coupling lens 20C, $h_{CL1V}$ is a size in the second direction or a direction corresponding thereto, of the coupling lens 20A, $h_{CL2V}$ is a size in the second direction or a direction corresponding thereto, of the coupling lens 20B, and $h_{CL3V}$ is a size in the second direction or a direction corresponding thereto, of the coupling lens 20C.

Functions and Effects

Subsequently, functions and effects of the projector 1 will be described. In the embodiment, the focal lengths $f_{CL1}$, $f_{CL2}$, and $f_{CL3}$ of the coupling lenses 20A, 20B, and 20C and the focal length $f_{FEL}$ of each of the fly-eye lenses 40A and 40B are set so that each light source image S formed on the fly-eye lens 40B by each cell 41 of the fly-eye lens 40A has a size not exceeding the size of one cell 42 of the fly-eye lens 40B. Herein, the solid-state light-emitting device 11 emits light from a light emission region configured of one or more dot-like light-emission spots, or one or more non-dot-like light-emission spots. The solid-state light-emitting device 11 is configured with, for example, one or more light-emitting diodes, one or more organic EL light-emitting devices, or one or more laser diodes. Therefore, even in a case where the fly-eye lens 40B is disposed on a focal position of the fly-eye lens 40A, each light source image S formed on the fly-eye lens 40B by each cell of the fly-eye lens 40A does not have a dot-like shape but has a certain size (see FIG. 9). However, in the embodiment, since one light source image S is not formed over a plurality of cells, light entering the fly-eye lens 40B reaches the illumination area efficiently. Accordingly, light use efficiency in the illumination optical system 1A may be improved.

In addition, in the embodiment, in the case where each cell of the fly-eye lenses 40A and 40B has an aspect ratio other than 1, when the focal lengths $f_{CL1H}$, $f_{CL2H}$, $f_{CL3H}$, $f_{CL1V}$, $f_{CL2V}$, and $f_{CL3V}$ of the coupling lenses 20A, 20B, and 20C, and the focal lengths $f_{FELH}$ and $f_{FELV}$ of each of the fly-eye lenses 40A and 40B are set with the aspect ratio taken into consideration, light use efficiency in the illumination optical system 1A may be further improved. In addition, in the embodiment, in the case where the coupling lenses 20A, 20B, and 20C each have an aspect ratio other than 1, when the focal lengths $f_{CL1H}$, $f_{CL2H}$, $f_{CL3H}$, $f_{CL1V}$, $f_{CL2V}$, and $f_{CL3V}$ and the numbers of apertures $NA_{1H}$, $NA_{2H}$, $NA_{3H}$, $NA_{1V}$, $NA_{2V}$, and $NA_{3V}$ of the coupling lenses 20A, 20B, and 20C are set with the aspect ratio taken into consideration, light use efficiency in the illumination optical system 1A may be further improved. Moreover, in the embodiment, in a case where the traveling-direction angles of the light sources 10A, 10B, and 10C are different from one another, when the focal lengths $f_{CL1H}$, $f_{CL2H}$, $f_{CL3H}$, $f_{CL1V}$, $f_{CL2V}$, and $f_{CL3V}$ and the numbers of apertures $NA_{1H}$, $NA_{2H}$, $NA_{3H}$, $NA_{1V}$, $NA_{2V}$, and $NA_{3V}$ of the coupling lenses 20A, 20B, and 20C are set with the traveling-direction angles taken into consideration, light use efficiency in the illumination optical system 1A may be further improved.

Second Embodiment

Configuration

FIGS. 10A and 10B illustrate a schematic configuration of a projector 3 according to a second embodiment of the disclosure. Note that the projector 3 corresponds to a specific example of "a projection type display unit" in the disclosure. FIG. 10A illustrates a configuration example of the projector 3 viewed from above (from y-axis direction), and FIG. 10B illustrates a configuration example of the projector 3 viewed from the side (x-axis direction). FIGS. 11A and 11B illustrate an example of light paths in the projector 3 of FIGS. 10A and 10B. FIG. 11A illustrates an example of the light paths of the projector 3 viewed from above (y-axis direction), and FIG. 11B illustrates an example of the light paths of the projector 3 viewed from the side (x-axis direction).

The projector 3 has a configuration different from the projector 1 having the illumination optical system 1A in that the projector 3 has an illumination optical system 3A. Accordingly, in the following description, different points from the projector 1 will be mainly described and the description of common points with the projector 1 will be appropriately omitted.

The illumination optical system 3A includes a coupling lens 20D and a dichroic mirror 30C instead of the coupling lenses 20A, 20B, and 20C and the dichroic mirrors 30A and 30B in the illumination optical system 1A. The dichroic mirror 30C is disposed on a position where optical axes of the light sources 10A, 10B, and 10C intersect with one another. The coupling lens 20D is disposed on a light exit side of the dichroic mirror 30C and between the dichroic mirror 30C and the integrator 40.

The dichroic mirror 30C includes two mirrors with wavelength selectivity. Note that the above-described mirrors are each configured by depositing multilayer interference film. The two mirrors are disposed to be orthogonal to each other so that the surfaces of the mirrors face the light exit side of the dichroic mirror 30C. As illustrated in FIGS. 11A and 11B, for example, the dichroic mirror 30C allows light (light entering from the light sources 10A and 10B side) entering from a back side of one of the mirrors (hereinafter, referred to as a mirror A for convenience) to pass therethrough to the front side of the mirror A, and reflects light entering from the front side of the mirror A (light entering from the light source 10C side) by the mirror A. In addition, as illustrated in FIGS. 11A and 11B, for example, the dichroic mirror 30C allows light (light entering from the light sources 10A and 10C side) entering from a back side of the other mirror (hereinafter, referred to as a mirror B for convenience) to pass therethrough to the front side of the mirror B, and reflects light entering from the front side of the mirror B (light entering from the light source 10B side) by the mirror B. Therefore, the light path unifying device 30 unifies individual light fluxes emitted from the light sources 10A, 10B, and 10C to generate a single light flux.

As illustrated in FIGS. 11A and 11B, for example, the coupling lens 20D substantially parallelizes light entering from the dichroic mirror 30C side, and converts a traveling-direction angle of the light entering from the dichroic mirror 30C to be equal to or close to a traveling-direction angle of parallelized light.

Functions and Effects

Next, functions and effects of the projector 3 will be described. In the embodiment, as in the first embodiment, the focal length $f_{CL4}$ of the coupling lens 20D and the focal length $f_{FEL}$ of each of the fly-eye lenses 40A and 40B are set so that each light source image S formed on the fly-eye lens 40B by each cell of the fly-eye lens 40A has a size not exceeding the size of one cell of the fly-eye lens 40B. Therefore, as in the first embodiment, light use efficiency in the illumination optical system 3A may be improved.

In addition, in the embodiment, in the case where each cell of the fly-eye lenses 40A and 40B has an aspect ratio other than 1, when the focal lengths $f_{CL4H}$ and $f_{CL4V}$ of the coupling lens 20D and the focal lengths $f_{FELH}$ and $f_{FELV}$ of the fly-eye lenses 40A and 40B are set with the aspect ratio taken into consideration, light use efficiency in the illumination optical system 3A may be further improved. Moreover, in the embodiment, in a case where the coupling lens 20D has an aspect ratio other than 1, when the focal lengths $f_{CL4H}$ and $f_{CL4V}$ and the numerical aperture $NA_{4H}$ and $NA_{4V}$ of the coupling lens 20D are set with the aspect ratio taken into consideration, light use efficiency in the illumination optical system 3A may be further improved.

Note that the focal lengths $f_{CL1}$, $f_{CL2}$, and $f_{CL3}$ in the first embodiment are replaced by the focal length $f_{CL4}$ of the coupling lens 20D in the second embodiment. Likewise, the focal lengths $f_{CL1H}$, $f_{CL2H}$, and $f_{CL3H}$ in the first embodiment are replaced by the focal length $f_{CL4H}$ in the first direction or a direction corresponding thereto, of the coupling lens 20D in the second embodiment. The focal lengths $f_{CL1V}$, $f_{CL2V}$, and $f_{CL3V}$ in the first embodiment are replaced by the focal length $f_{CL4V}$ in the second direction or a direction corresponding thereto, of the coupling lens 20D in the second embodiment. The beam sizes $\varphi_{CL1}$, $\varphi_{CL2}$, and $\varphi_{CL3}$ in the first embodiment are replaced by the beam size ($P_{CL4}$ of light entering the coupling lens 20D in the second embodiment. The numbers of apertures $NA_1$, $NA_2$, and $NA_3$ in the first embodiment are replaced by the numerical aperture $NA_4$ of the coupling lens 20D in the second embodiment. The sizes $h_{CL1}$, $h_{CL2}$, and $h_{CL3}$ in the first embodiment are replaced by a size $h_{CL4}$ of the coupling lens 20D in the second embodiment. The beam sizes $\varphi_{CL1H}$, $\varphi_{CL2H}$, and $\varphi_{CL3H}$ in the first embodiment are replaced by a beam size ($P_{CL4H}$ in the first direction (for example, in the lateral direction) or a direction corresponding thereto, of light entering the coupling lens 20D in the second embodiment. The beam sizes $\varphi_{CL1V}$, $\varphi_{CL2V}$, and $\varphi_{CL3V}$ in the first embodiment are replaced by a beam size ($P_{CL4V}$ in the second direction (for example, in the longitudinal direction) or a direction corresponding thereto, of the light entering the coupling lens 20D in the second embodiment. The numerical apertures $NA_{1H}$, $NA_{2H}$, and $NA_{3H}$ in the first embodiment are replaced by the numerical aperture $NA_{4H}$ in the first direction or a direction corresponding thereto, of the coupling lens 20D in the second embodiment. The sizes $h_{CL1H}$, $h_{CL2H}$, and $h_{CL3H}$ in the first embodiment are replaced by a size $h_{CL4H}$ in the first direction or a direction corresponding thereto, of the coupling lens 20D in the second embodiment. The sizes $h_{CL1V}$, $h_{CL2V}$, and $h_{CL3V}$ in the first embodiment are replaced by a size $h_{CL4V}$ in the second direction or a direction corresponding thereto, of the coupling lens 20D in the second embodiment. Incidentally, these replacements are similarly performed in the subsequent embodiments.

Third Embodiment

Configuration

Figures 12A, 12B:
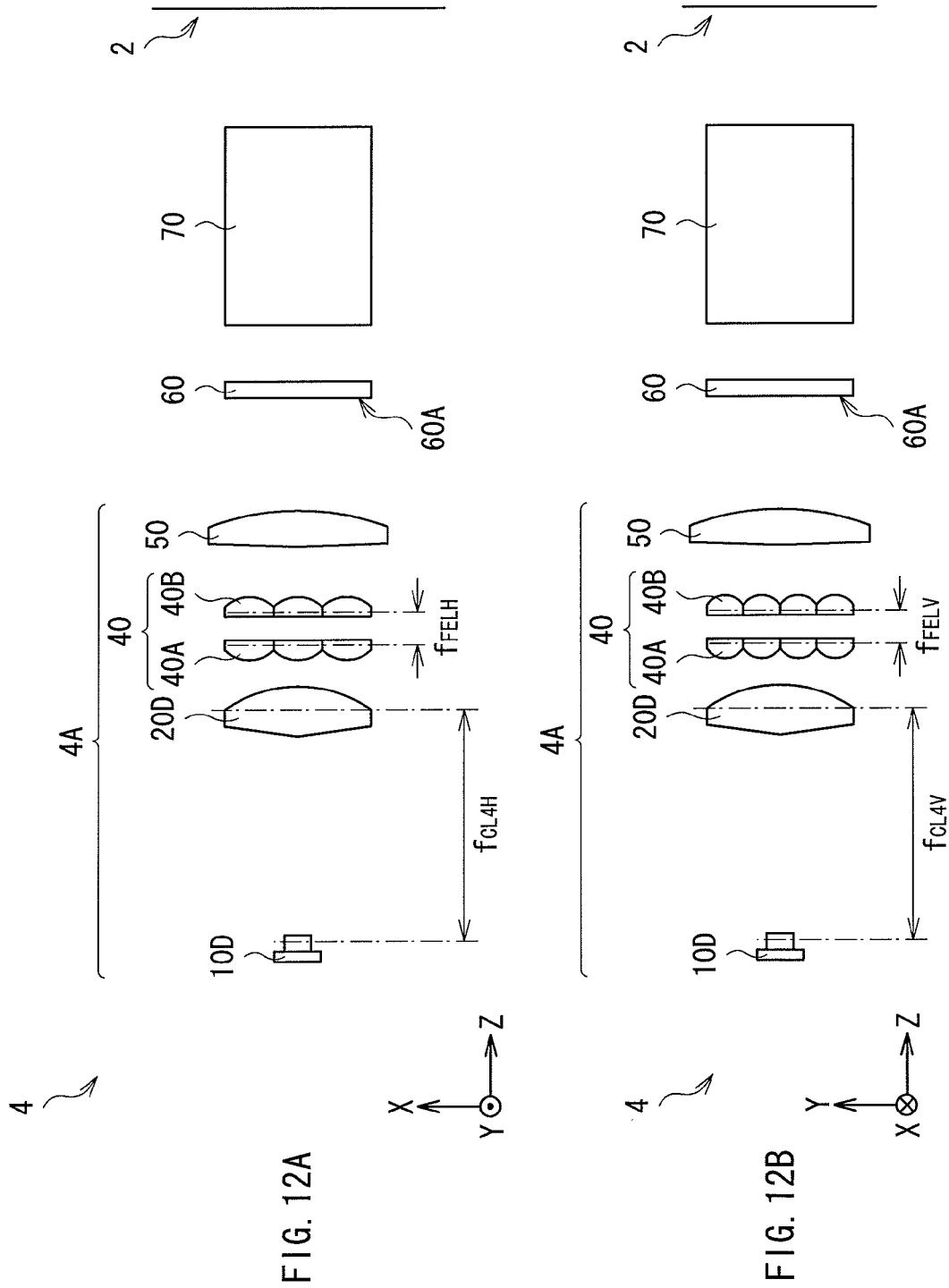
FIGS. 12A and 12B are diagrams illustrating a schematic configuration of a projector according to a third embodiment of the disclosure.

FIGS. 12A and 12B illustrate a schematic configuration of a projector 4 according to a third embodiment of the disclosure. Note that the projector 4 corresponds to a specific example of "a projection type display unit" in the disclosure. FIG. 12A illustrates a configuration example of the projector 4 viewed from above (y-axis direction), and FIG. 12B illustrates a configuration example of the projector 4 viewed from the side (x-axis direction). FIGS. 13A and 13B illustrate an example of light paths in the projector 4 of FIGS. 12A and 12B. FIG. 13A illustrates an example of the light paths of the projector 4 viewed from above (y-axis direction), and FIG. 13B illustrates an example of the light paths of the projector 4 viewed from the side (x-axis direction).

The projector 4 has a configuration different from the configuration of the projector 3 having the illumination optical system 3A in that the projector 4 includes an illumination optical system 4A. Therefore, in the following description, different points from the projector 3 will be mainly described and the description of common points to the projector 3 will be appropriately omitted.

The illumination optical system 4A includes a light source 10D instead of the light sources 10A, 10B, and 10C, and the dichroic mirror 30C in the illumination optical system 3A. The light source 10D is arranged on the optical axis of the coupling lens 20D, and the illumination optical system 4A is configured to allow light emitted from the light source 10D to enter the coupling lens 20D directly.

The light source 10D has, for example, the solid-state light-emitting device 11 and the package 12 which supports and covers the solid-state light-emitting device 11. The solid-state light-emitting device 11 included in the light source 10D emits light from a light emission region which is configured of one or more dot-like light-emission spots, or one or more non-dot-like light-emission spots. The solid-state light-emitting device 11 included in the light source 10D may be configured of, for example, a single chip 11A emitting light of a predetermined wavelength range, or a plurality of chips 11A emitting light of the same wavelength range or different wavelength ranges. In a case where the solid-state light-emitting device 11 included in the light source 10D is configured of a plurality of chips 11A, the chips 11A are arranged, for example, in lateral line, or in lateral and longitudinal directions, that is, in a lattice.

The chip 11A is configured of a light-emitting diode (LED), an organic EL light-emitting device (OLED), or a laser diode (LD). In the case where the light source 10D includes a plurality of chips 11A, all chips 11A included in the light source 10D may be configured with one kind of LEDs, OLEDs, or LDs. In the case where the light source 10D includes a plurality of chips 11A, some chips 11A may be configured with LEDs, and the other chips 11A may be configured with OLED. Moreover, in the case where the light source 10D includes a plurality of chips 11A, some chips 11A may be configured with LEDs, and the other chips 11A may be configured with LDs. Furthermore, in the case where the light source 10D includes a plurality of chips 11A, some chips 11A may be configured with OLEDs, and the other chips 11A may be configured with LDs.

In the case where the light source 10D includes a plurality of chips 11A, all chips 11A included in the light source 10D may emit light of the same wavelength range or different wavelength ranges. In the case where the light source 10D includes a plurality of chips 11A, all chips 11A may emit light with wavelength of approximately 400 nm to 500 nm (blue light), may emit light with wavelength of approximately 500 nm to 600 nm (green light), or may emit light with wavelength of approximately 600 nm to 700 nm (red light). In addition, in the case where the light source 10D includes a plurality of chips 11A, the plurality of chips 11A included in the light source 10D may be configured by combination of chips emitting light with wavelength of approximately 400 nm to 500 nm (blue light), chips emitting light with wavelength of approximately 500 nm to 600 nm (green light), and chips emitting light with wavelength of approximately 600 nm to 700 nm (red light).

Functions and Effects

Next, functions and effects of the projector 4 in the embodiment will be described. In the embodiment, as in the second embodiment, the focal length $f_{CL4}$ of the coupling lens 20D and the focal length $f_{FEL}$ of each of the fly-eye lenses 40A and 40B are set so that each light source image S formed on the fly-eye lens 40B by each cell of the fly-eye lens 40A has a size not exceeding the size of one cell of the fly-eye lens 40B. Therefore, as in the second embodiment, light use efficiency in the illumination optical system 4A may be improved.

Moreover, in the embodiment, in a case where each cell of the fly-eye lenses 40A and 40B has an aspect ratio other than 1, when the focal lengths $f_{CL4H}$ and $f_{CL4V}$ of the coupling lens 20D and the focal lengths $f_{FELH}$ and $f_{FELV}$ of the fly-eye lenses 40A and 40B are set with the aspect ratio taken into consideration, light use efficiency in the illumination optical system 4A may be further improved. Furthermore, in the embodiment, in a case where the coupling lens 20D has an aspect ratio other than 1, when the focal lengths $f_{CL4H}$ and $f_{CL4V}$ and the numerical aperture $NA_{4H}$ and $NA_{4V}$ of the coupling lens 20D are set with the aspect ratio taken into consideration, light use efficiency in the illumination optical system 4A may be further improved.

Fourth Embodiment

Configuration

FIGS. 14A and 14B illustrate a schematic configuration of a projector 5 according to a fourth embodiment of the disclosure. Note that the projector 5 corresponds to a specific example of "a projection type display unit" in the disclosure. FIG. 14A illustrates a configuration example of the projector 5 viewed from above (y-axis direction), and FIG. 14B illustrates a configuration example of the projector 5 viewed from the side (x-axis direction).

The projector 5 has a configuration different from that of the projector 4 having the illumination optical system 4A in that the projector 5 includes an illumination optical system 5A. Therefore, in the following description, different points from the projector 4 will be mainly described and the description of common points with the projector 4 will be appropriately omitted.

In the illumination optical system 5A, the optical axes of the light source 10D and the coupling lens 20D are tilted to a direction intersecting the optical axis of the integrator 40. The optical axes of the light source 10D and the coupling lens 20D are preferably tilted to a lateral direction as illustrated in FIG. 14A. Incidentally, although not illustrated, the optical axes of the light source 10D and the coupling lens 20D may be tilted to a longitudinal direction or may not be tilted.

The illumination optical system 5A further includes a polarization splitter 80 and a retardation plate array 90. The polarization splitter 80 is disposed between the coupling lens 20D and the integrator 40, and the retardation plate array 90 is disposed between the integrator 40 and the condenser lens 50 (or the illumination area 60A). In the embodiment, the fly-eye lens 40B is disposed a position which is closer to the fly-eye lens 40A relative to a position of the focal point of the fly-eye lens 40A, and the retardation plate array 90 is disposed on the focal point (or substantially on the focal point) of the fly-eye lens 40A.

Figure 15A:
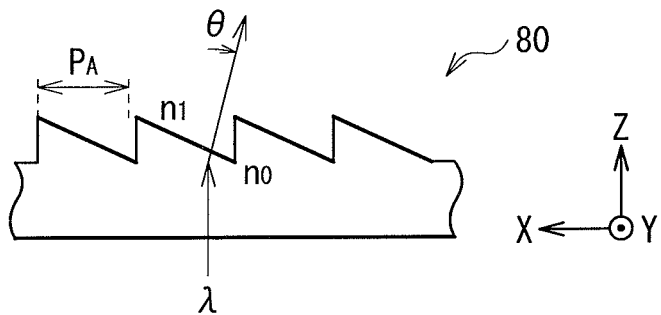
FIGS. 15A and 15B are diagrams illustrating an example of a cross-sectional configuration of a polarization splitter in FIGS. 14A and 14B.
Figure 15B:
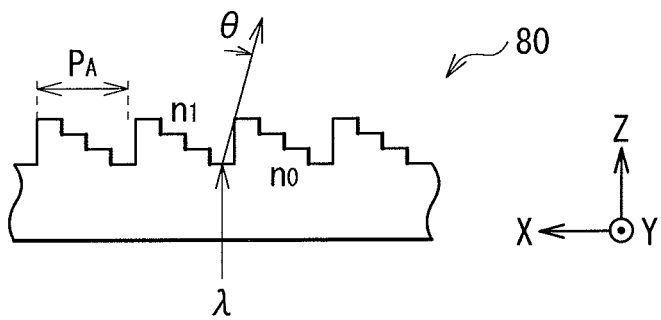

The polarization splitter 80 is an optical device with anisotropy to polarization of entering light, and splits (for example, diffracts) light entering from the coupling lens 20D side so that the traveling direction of S-polarization component is different from that of P-polarization component. The splitting direction of the polarization is preferably a lateral direction, however, may be a longitudinal direction. As illustrated in FIGS. 15A and 15B, for example, the polarization splitter 80 is preferably a polarization diffraction device having a concave-convex shape on one surface. The concave-convex shape is configured by arranging in parallel a plurality of strip-shaped convex sections with blade shape or step shape. Incidentally, the polarization splitter 80 may be a binary type polarization diffraction device, although not illustrated.

The polarization splitter 80 allows light of S-polarization component contained in light entering from the coupling lens 20D side to pass therethrough so that an incident angle and an output angle of the light are equal to (or substantially equal to) each other. Moreover, the polarization splitter 80 allows light of P-polarization component contained in the light entering from the coupling lens 20D side to be diffracted and to pass therethrough so that the incident angle and the output angle of the light are different from each other. Note that the polarization splitter 80 may allow light of P-polarization component contained in the light entering from the coupling lens 20D side to pass therethrough so that the incident angle and the output angle of the light are equal to (or substantially equal to) each other, for example, in contradiction to the above-described example. In this case, the polarization splitter 80 may further allow light of S-polarization component contained in the light entering from the coupling lens 20D to be diffracted and to pass therethrough so that the incident angle and the output angle of the light are different from each other. It is preferable that the traveling direction of S-polarized light output from the polarization splitter 80 be opposite to and line symmetrical to the traveling direction of the P-polarized light output from the polarization splitter 80, in association with relationship with a normal (optical axis) of the polarization splitter 80.

Figure 16:
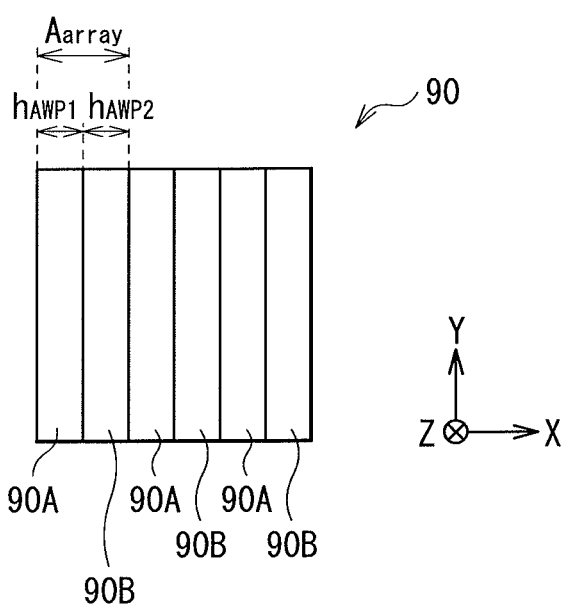
FIG. 16 is a diagram illustrating an example of a top surface configuration of a retardation plate array in FIGS. 14A and 14B.

As illustrated in FIG. 16, for example, the retardation plate array 90 has first regions 90A and second regions 90B which have different phase differences. The first regions 90A are arranged in positions where either one of S- and P-polarization components, which are split by the polarization splitter 80, enters, and the first regions 90A allow light entering the first regions 90A to pass therethrough with maintaining the polarization direction. On the other hand, the second regions 90B are arranged in positions where polarization component different from the polarization component entering the first regions 90A of the S- and the P-polarization components, which are split by the polarization splitter 80, enters, and the second regions 90B convert light entering the second regions 90B into polarized light equivalent to polarized light of light entering the first regions 90A. The first regions 90A and the second regions 90B each have a strip shape extending in a direction orthogonal to a splitting (diffraction) direction by the polarization splitter 80, and are arranged alternately in a direction parallel to the splitting (diffraction) direction by the polarization splitter 80. In a case where each cell of the fly-eye lenses 40A and 40B has an aspect ratio other than 1, both the first regions 90A and the second regions 90B preferably extend in a direction perpendicular to the longitudinal direction of the fly-eye lenses 40A and 40B.

The total width $A_{array}$ of the first region 90A and the second region 90B which are adjacent to each other is, for example, equal to the width of one cell 42 of the fly-eye lens 40B. In a case where the first region 90A and the second region 90B are arranged in a lateral direction, for example, as illustrated in FIG. 16, the total width $A_{array}$ thereof is, for example, equal to the width ($h_{FEL2H}$) in the lateral direction of the cell 42. In a case where the first region 90A and the second region 90B are arranged in a longitudinal direction although not illustrated, the total width $A_{array}$ is, for example, equal to the width ($h_{FEL2V}$) in the longitudinal direction of the cell 42. The width $h_{AWP1}$ of the first region 90A and the width $h_{AWP2}$ of the second region 90B are equal to each other, for example.

Figure 17A:
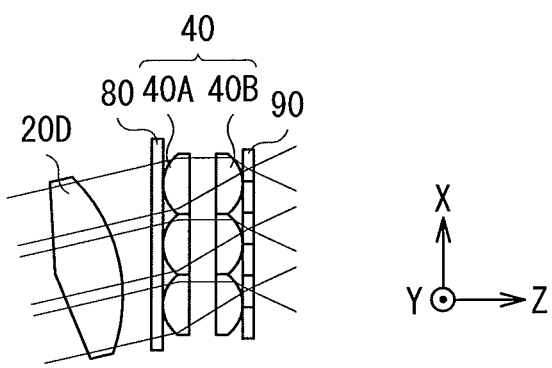
FIGS. 17A to 17C are diagrams illustrating an example of light paths in the projector in FIGS. 14A and 14B.
Figure 17B:
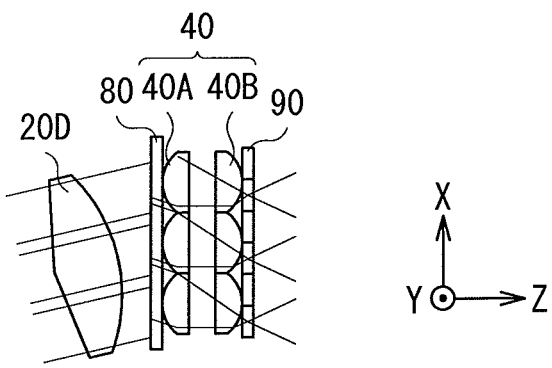
Figure 17C:
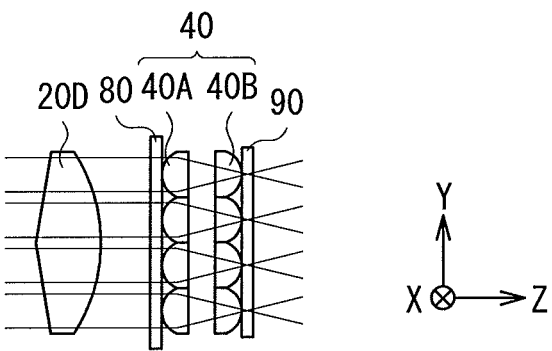

Incidentally, in the embodiment, for example, as illustrated in FIGS. 17A to 17C, light from the coupling lens 20D side enters the polarization splitter 80 from an oblique direction. Note that FIG. 17A schematically illustrates only light paths of S-polarization component or P-polarization component of the light having entered the polarization splitter 80, and FIG. 17B schematically illustrates only light paths of the polarization component different from the polarization component illustrated in FIG. 17A, contained in the light having entered the polarization splitter 80. FIG. 17C schematically illustrates a state where the light paths are shared irrespective of the polarization component.

For example, light whose optical axis is tilted to a direction (for example, a lateral direction) parallel to an arrangement direction in the retardation plate array 90 enters the polarization splitter 80. Therefore, for example, as illustrated in FIGS. 17A and 17B, light of one of the polarization components contained in the light having entered the polarization splitter 80 is emitted in a direction parallel to an optical axis of incident light, and light of the other polarization component contained in the light having entered the polarization splitter 80 is emitted in a direction intersecting the optical axis of the incident light. At this time, a bisector of the optical axis of the light emitted in the direction parallel to the optical axis of the incident light and the optical axis of the light emitted in the direction intersecting the optical axis of the incident light is preferably parallel to (or substantially parallel to) a normal (z-axis) of the polarization splitter 80.

Light emitted in the direction parallel to the optical axis of the incident light is divided into a plurality of fine light fluxes by the integrator 40 to enter the first regions 90A of the retardation plate array 90, for example, as illustrated in FIG. 17A. In addition, light emitted in the direction intersecting the optical axis of the incident light is divided into a plurality of fine light fluxes by the integrator 40 to enter, for example, the second regions 90B of the retardation plate array 90 as illustrated in FIG. 17B, for example. Although not illustrated, the light emitted in the direction parallel to the optical axis of the incident light may enter the second regions 90B of the retardation plate array 90 and the light emitted in the direction intersecting the optical axis of the incident light may enter the first regions 90A of the retardation plate array 90. In either case, one of the P-polarization light and S-polarization light is mainly emitted from the retardation plate array 90.

Figure 18:
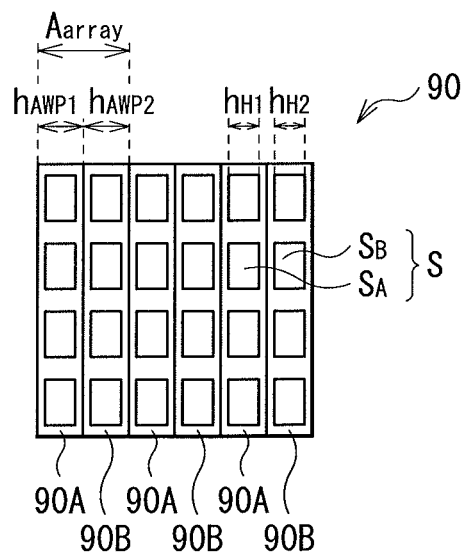
FIG. 18 is a schematic diagram illustrating an example of light source images appearing in a fly-eye lens disposed backward in the projector in FIGS. 14A and 14B.
Figure 21A:
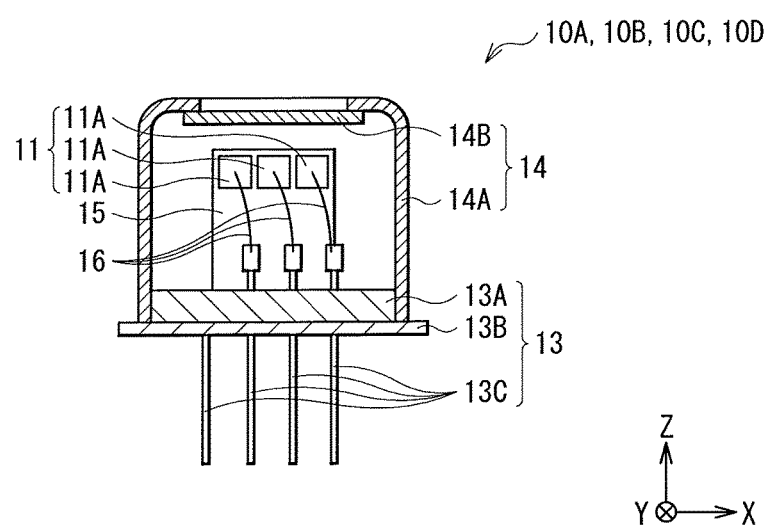
FIG. 21A is a diagram illustrating an example of a cross-sectional configuration of a modification of the light source according to each of the first to fourth embodiments.
Figure 21B:
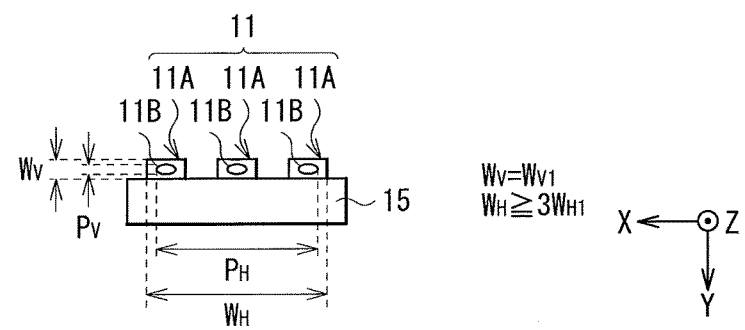
FIG. 21B is a diagram illustrating a solid-state light-emitting device included in the light source of FIG. 21A, viewed from a light emission surface side.
Figure 22A:
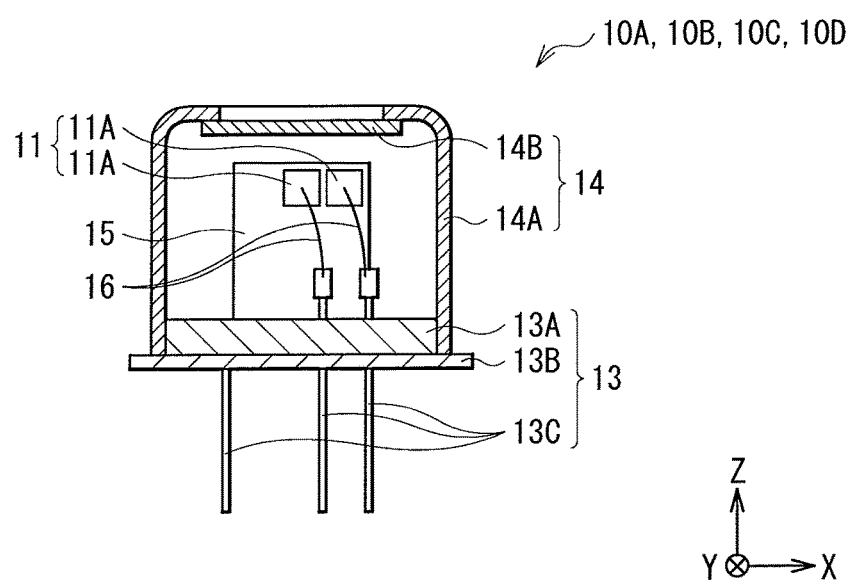
FIG. 22A is a diagram illustrating another example of the cross-sectional configuration of the light source of FIG. 21A.
Figure 22B:
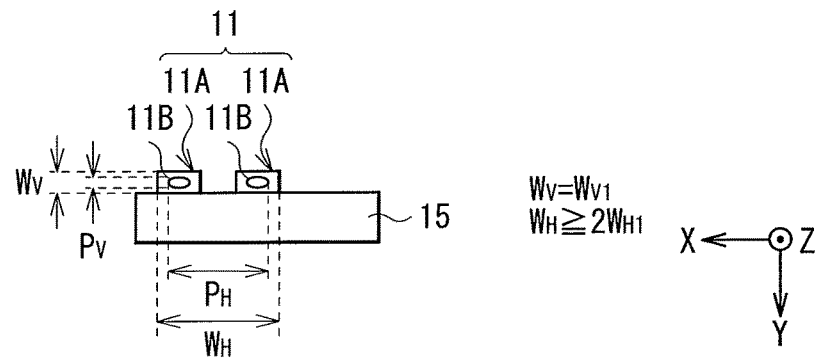
FIG. 22B is a diagram illustrating a solid-state light-emitting device included in the light source of FIG. 22A, viewed from a light emission surface side.

The light emitted in the direction parallel to the optical axis of the incident light is divided into fine light fluxes by the fly-eye lens 40A, and then each of the divided light fluxes is focused substantially in the first regions 90A of the retardation plate array 90 to form secondary light source planes (light source images $S_A$) at this place (see FIG. 18). Likewise, the light emitted in the direction intersecting the optical axis of the incident light is divided into fine light fluxes by the fly-eye lens 40A, and then each of the divided light fluxes is focused substantially in the second regions 90B of the retardation plate array 90 to form secondary light source planes (light source images $S_B$) at this place (see FIG. 18). Note that the light source images configured of the light source images $S_A$ and $S_B$ correspond to the light source images $S$ in the above-described embodiment.

In the embodiment, the focal length $f_{CL4}$ of the coupling lens 20D and the focal length $f_{FEL}$ of each of the fly-eye lenses 40A and 40B are set so that each light source image $S_1$ and each light source image $S_2$ which is formed on the retardation plate array 90 by each cell 41 of the fly-eye lens 40A has a size not exceeding the size of one cell of the first region 90A and one cell of the second region 90B, respectively.

Herein, in a case where both the first region 90A and the second region 90B extend in the second direction, the above conditions are expressed by the following expressions (23) and (24). In addition, the above conditions are schematically illustrated in FIG. 18.

$$h_{H1} = P_{4H} * (f_{FEL}/f_{CL4H}) \leq h_{AWP1} \tag{23}$$

$$h_{H2} = P_{4H} * (f_{FEL}/f_{CL4H}) \leq h_{AWP2} \tag{24}$$

where $h_{H1}$ is a size in the first direction or a direction corresponding thereto, of the light source image $S_A$, $h_{H2}$ is a size in the first direction or a direction corresponding thereto, of the light source image $S_B$, $P_{4H}$ is a size in the first direction or a direction corresponding thereto, of the light emission region of the solid-state light-emitting device 11 included in the light source 10D, $f_{CL4H}$ is a focal length in the first direction or a direction corresponding thereto, of the coupling lens 20D, $h_{AWP1}$ is a size in the arrangement direction of the first region 90A, and $h_{AWP2}$ is a size in the arrangement direction of the second region 90B.

Incidentally, in a case where the solid-state light-emitting device 11 is configured of a single chip 11A, $P_{4H}$ is equal to a size in the first direction or a direction corresponding thereto, of the light-emission spot 11B of the chip 11A. In a case where the solid-state light-emitting device 11 is configured of a plurality of chips 11A, $P_{4H}$ is equal to a size in the first direction or a direction corresponding thereto, of an enclosure which encloses the light-emission spots 11B of the all chips 11A with a minimum inner area. Moreover, in a case where the coupling lens 20D is configured of a plurality of lenses, $f_{CL4H}$ is the combined focal length in the first direction or a direction corresponding thereto, of the lenses.

As expressions substantially equivalent to the above-described expressions (23) and (24), the following expressions (25) and (26) are cited. The expressions (25) and (26) are especially advantageous in a case where the size of the light emission region of the solid-state light-emitting device 11 is substantially equal to the size of the solid-state light-emitting device 11.

$$h_{H1} = W_{4H} * (f_{FEL}/f_{CL4H}) \leq h_{AWP1} \tag{25}$$

$$h_{H2} = W_{4H} * (f_{FEL}/f_{CL4H}) \leq h_{AWP2} \tag{26}$$

where $W_{4H}$ is a size in the first direction or a direction corresponding thereto, of the solid-state light-emitting device 11 included in the light source 10D.

Note that in the case where the solid-state light-emitting device 11 is configured of a single chip 11A, $W_{4H}$ is equal to the size of the chip 11A. In the case where the solid-state light-emitting device 11 is configured of a plurality of chips 11A, when all chips 11A are regarded as a single chip, $W_{4H}$ is equal to the size of the single chip.

Functions and Effects

Subsequently, functions and effects of the projector 5 will be described. In the embodiment, the focal length $f_{CL4}$ of the coupling lens 20D and the focal length $f_{FEL}$ of each of the fly-eye lenses 40A and 40B are set so that each light source image $S_1$ and each light source image $S_2$ formed on the retardation plate array 90 by each cell 41 of the fly-eye lens 40A has a size not exceeding the size of one cell of the first region 90A and one cell of the second region 90B, respectively. Accordingly, light use efficiency in the illumination optical system 5A may be improved.

Moreover, in the embodiment, in the case where each cell of the fly-eye lenses 40A and 40B has an aspect ratio other than 1, when the focal lengths $f_{CL4H}$ and $f_{CL4V}$ of the coupling lens 20D and the focal lengths $f_{FELH}$ and $f_{FELV}$ of each of the fly-eye lenses 40A and 40B are set with the aspect ratio taken into consideration, light use efficiency in the illumination optical system 5A may be further improved. In addition, in the embodiment, in the case where the coupling lens 20D has an aspect ratio other than 1, when the focal lengths $f_{CL4H}$ and $f_{CL4V}$ of the coupling lens 20D and the numbers of the apertures $NA_{4H}$ and $NA_{4V}$ are set with the aspect ratio taken into consideration, light use efficiency in the illumination optical system 5A may be further improved.

Furthermore, in the embodiment, the polarization splitter 80 is disposed in front of the integrator 40, the retardation plate array 90 is disposed in the rear of the integrator 40, viewed from the light source 10D side, and light from the coupling lens 20D is allowed to enter the polarization splitter 80 in an oblique direction. Therefore, when a polarization plate is used on a light incident side or the like of the spatial modulation device 60, light emitted from the light source 10D is allowed to be converted into polarization light mainly containing polarization component parallel to a transmission axis of the polarization plate. As a result, light loss caused in the polarization plate, which is provided on the light incident side or the like of the spatial modulation device 60, may be decreased, and thus light use efficiency in the entire projector 5 may be substantially improved.

5. Examples

Next, examples of the illumination optical systems 1A, 3A, 4A, and 5A respectively used in the projectors 1, 3, 4, and 5 according to each of the embodiments will be described. FIG. 19 illustrates designed values of examples of the first to third embodiments, and FIG. 20 illustrates designed value of example of the fourth embodiment. Examples 1 to 3 in the figure correspond to the designed values common to the illumination optical systems 1A, 3A, and 4A, and example 4 in the figure corresponds to the designed values for the illumination optical system 5A. "Conditional Expressions" described at lowermost in FIG. 19 were obtained by substituting the designed values into the following expressions (27) to (29) and (31) to (33). The expressions (27) to (29) and (31) to (33) were obtained by combining the expressions (17) to (22) and expressions in which $P_{H1}$, $P_{2H}$, $P_{3H}$, $P_{1V}$, $P_{2V}$, and $P_{3V}$ in the above-described expressions (7) to (12) were replaced by $W_{H1}$, $W_{2H}$, $W_{3H}$, $W_{1V}$, $W_{2V}$, and $W_{3V}$, respectively. "Conditional Expressions" in FIG. 20 were obtained by substituting the designed values into the following expressions (30) and (34) which were obtained in a similar way. Note that in FIG. 19 and FIG. 20, $f_{CL1H}$, $f_{CL2H}$, $f_{CL3H}$, and $f_{CL4H}$ were collectively described as $f_{CLH}$ for convenience, and $f_{CL1V}$, $f_{CL2V}$, $f_{CL3V}$, and $f_{CL4V}$ were collectively described as $f_{CLV}$ for convenience. In addition, in FIG. 19 and FIG. 20, the numbers of the apertures $NA_{1H}$, $NA_{2H}$, $NA_{3H}$, and $NA_{4H}$ were collectively described as $NA_H$ for convenience, and the numbers of the apertures $NA_{1V}$, $NA_{2V}$, $NA_{3V}$, and $NA_{4V}$ were collectively described as $NA_V$ for convenience.

$$(w_{1H}/h_{FEL2H})^* f_{FELH} \leq f_{CL1H} \leq h_{CL1H}/(2 \times NA_{1H}) \quad (27)$$

$$(w_{2H}/h_{FEL2H})^* f_{FELH} \leq f_{CL2H} \leq h_{CL2H}/(2 \times NA_{2H}) \quad (28)$$

$$(w_{3H}/h_{FEL2H})^* f_{FELH} \leq f_{CL3H} \leq h_{CL3H}/(2 \times NA_{3H}) \quad (29)$$

$$(w_{4H}/h_{FEL2H})^* f_{FELH} \leq f_{CL4H} \leq h_{CL4H}/(2 \times NA_{4H}) \quad (30)$$

$$(w_{1V}/h_{FEL2H})^* f_{FELH} \leq f_{CL1V} \leq h_{CL1V}/(2 \times NA_{1V}) \quad (31)$$

$$(w_{2V}/h_{FEL2H})^* f_{FELH} \leq f_{CL2V} \leq h_{CL2V}/(2 \times NA_{2V}) \quad (32)$$

$$(w_{3V}/h_{FEL2H})^* f_{FELH} \leq f_{CL3V} \leq h_{CL3V}/(2 \times NA_{3V}) \quad (33)$$

$$(w_{4V}/h_{FEL2H})^* f_{FELH} \leq f_{CL4V} \leq h_{CL4V}/(2 \times NA_{4V}) \quad (34)$$

It is understood from FIG. 19 and FIG. 20 that any designed value may be used to set the focal lengths $f_{CL1H}$, $f_{CL2H}$, $f_{CL3H}$, $f_{CL4H}$, $f_{CL1V}$, $f_{CL2V}$, $f_{CL3V}$, and $f_{CL4V}$ which satisfy the expressions (27) to (34), respectively.

6. Modifications

As described above, although the disclosure has been described with referring to the several embodiments, the disclosure is not limited thereto, and various modifications may be made.

Modification 1

For example, in the embodiment, as illustrated in FIGS. 3A and 3B to FIGS. 6A and 6B, the case where the chip 11A is a top emission type element has been described, however, the chip 11A may be an end-surface emission type element. In this case, as illustrated in FIGS. 21A and 21B to FIGS. 26A and 26B, for example, the light sources 10A, 10B, 10C, and 10D each have a can-type structure in which a solid-state light-emitting device 11 configured of one or more end-surface emission type chips 11A is contained in an inner space enclosed by a stem 13 and a cap 14.

The stem 13 configures, together with the cap 14, a package of the light source 10A, 10B, 10C, or 10D, and for example, includes a support substrate 13A supporting a sub mount 15, an outer frame substrate 13B disposed on the rear surface of the support substrate 13A, and a plurality of connection terminals 13C. The sub mount 15 is made of a material having conductivity and heat radiation property. The support substrate 13A and the outer frame substrate 13B are each configured by forming one or more insulation through-holes and one or more conductive through-holes on a substance having conductivity and heat radiation property. Each of the support substrate 13A and the outer frame substrate 13B has, for example, a disc-like shape, and are stacked so that central axes (not illustrated) of both substrates are coincident with each other. The outer frame substrate 13B has a diameter larger than that of the support substrate 13A. The outer edge of the outer frame substrate 13B is a circular flange projecting toward a radiation direction from the central axis thereof in a plane whose normal is the central axis of the outer frame substrate 13B. The flange has a function of defining a reference position for fitting the cap 14 in the support substrate 13A in manufacturing process. The plurality of connection terminals 13C penetrates at least the support substrate 13A. Terminals except for one or more terminals of the connection terminals 13C (hereinafter, referred to as "terminal(s) α" for convenience) are electrically connected to electrodes (not illustrated) of the individual chips 11A, respectively. For example, the terminals α project long toward the outer frame substrate 13B side and project short toward the support substrate 13A side. Moreover, terminals other than the above-described terminals α of the connection terminals 13C (hereinafter, referred to as "terminal(s) β" for convenience) are electrically connected to the other electrodes (not illustrated) of all chips 11A. For example, the terminals β project long toward the outer frame substrate 13B side and the end edges on the support substrate 13A side of the terminals β are embedded in the support substrate 13A. In each connection terminal 13C, a portion projecting long toward the outer frame substrate 13B side corresponds to, for example, a portion embedded in the substrate or the like. On the other hand, in each connection terminal 13C, a portion projecting short toward the support substrate 13A side corresponds to a portion electrically connected one-to-one to the chip 11A through a wire 16. In each connection terminal 13C, a portion embedded in the support substrate 13A corresponds to, for example, a portion electrically connected to all chips 11A through the support substrate 13A and the sub mount 15. The terminals α are supported by the insulation through-holes provided in the support substrate 13A and the outer frame substrate 13B, and the through-hole insulates and separates the terminals α from the support substrate 13A and the outer frame substrate 13B. Moreover, the terminals α are insulated and separated from each other by the above-described insulation member. On the other hand, the terminals β are supported by the conductive through-holes provided in the support substrate 13A and the outer frame substrate 13B, and are electrically connected to the through-holes.

The cap 14 seals the solid-state light-emitting device 11. The cap 14 has, for example, a cylindrical portion 14A provided with apertures on a top and a bottom thereof. The bottom of the cylindrical portion 14A is, for example, in contact with a side surface of the support substrate 13A, and the solid-state light-emitting device 11 is positioned in an inner space of the cylindrical portion 14A. The cap 14 has a light transmission window 14B arranged so as to cover the aperture on the top of the cylindrical portion 14A. The light transmission window 14B is disposed on a position facing to the light emission surface of the solid-state light-emitting device 11, and has a function of transmitting light output from the solid-state light-emitting device 11.

In the modification, the solid-state light-emitting device 11 emits light from the light emission region configured of one or more dot-like light-emission spots, or one or more non-dot-like light-emission spots. The solid-state light-emitting device 11 may be configured of, for example, a single chip 11A emitting light of a predetermined wavelength range, a plurality of chips 11A emitting light of the same wavelength range, or a plurality of chips 11A emitting light of different wavelength ranges. In the case where the solid-state light-emitting device 11 is configured of a plurality of chips 11A, the chips 11A are arranged in a lateral line as illustrated in FIGS. 21A and 21B and FIGS. 22A and 22B, for example, or are arranged in a longitudinal line as illustrated in FIGS. 24A and 24B and 25A and 25B, for example. The number of the chips 11A included in the solid-state light-emitting device 11 may be different or the same in the light sources 10A, 10B, 10C, and 10D.

Figure 23A:
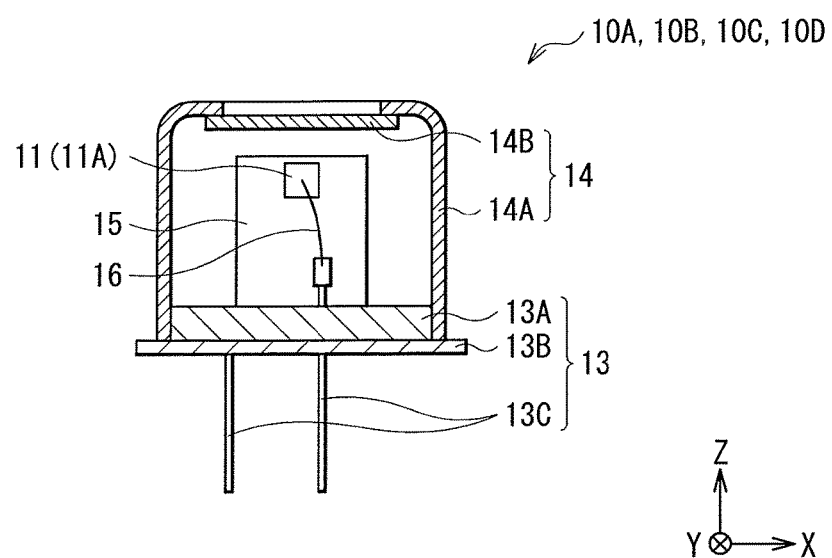
FIG. 23A is a diagram illustrating still another example of the cross-sectional configuration of the light source of FIG. 21A.
Figure 23B:
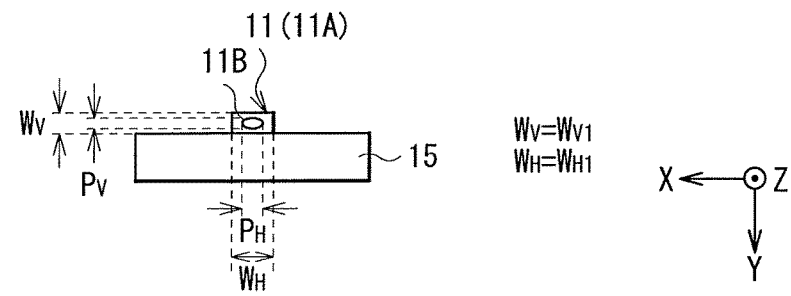
FIG. 23B is a diagram illustrating a solid-state light-emitting device included in the light source of FIG. 23A, viewed from a light emission surface side.
Figure 24A:
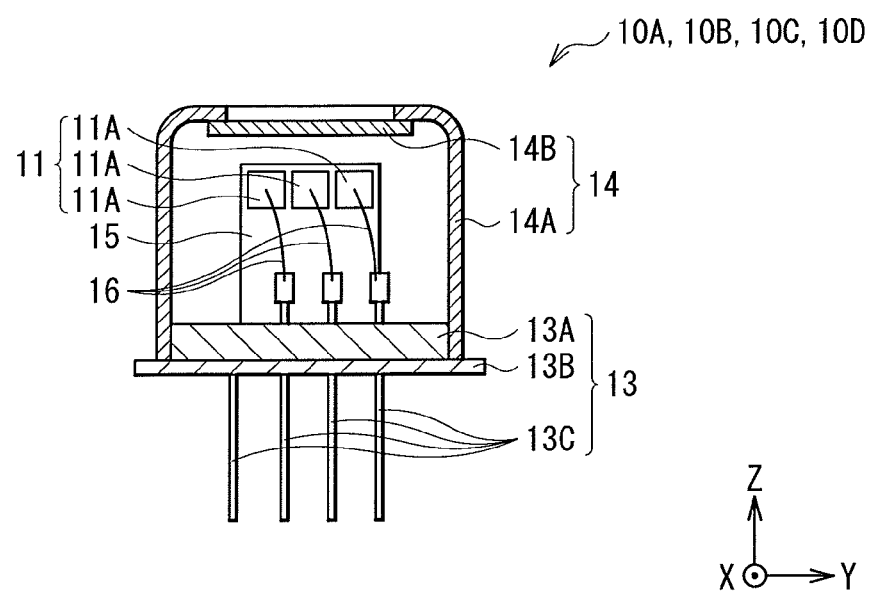
FIG. 24A is a diagram illustrating an example of a cross-sectional configuration of the light source of FIG. 21A, which is rotated by 90 degrees in XY plane.
Figure 24B:
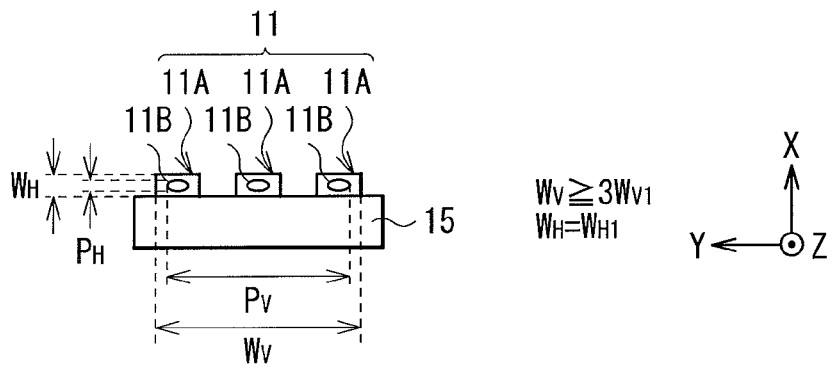
FIG. 24B is a diagram illustrating a solid-state light-emitting device included in the light source of FIG. 24A, viewed from a light emission surface side.
Figure 25A:
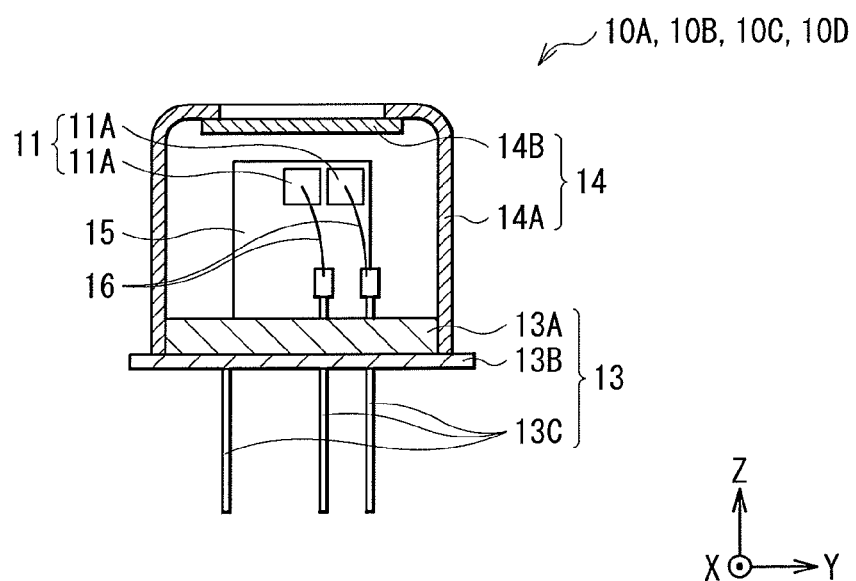
FIG. 25A is a diagram illustrating an example of a cross-sectional configuration of the light source of FIG. 22A, which is rotated by 90 degrees in XY plane.
Figure 25B:
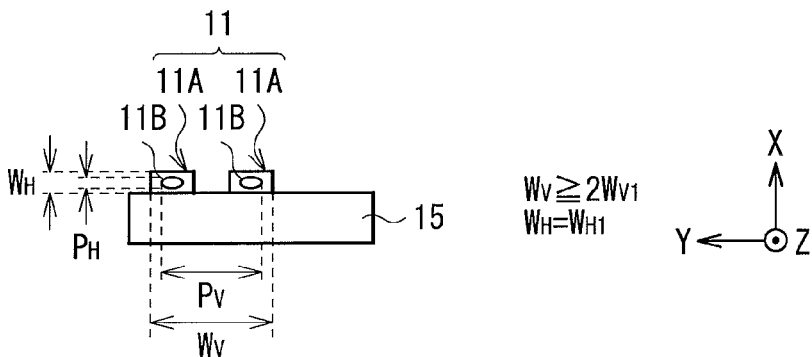
FIG. 25B is a diagram illustrating a solid-state light-emitting device included in the light source of FIG. 25A, viewed from a light emission surface side.
Figure 26A:
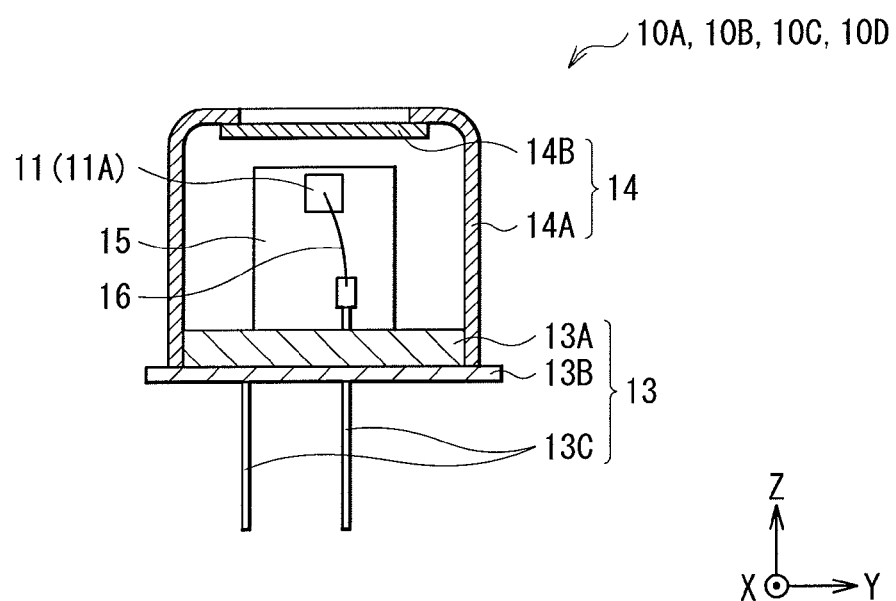
FIG. 26A is a diagram illustrating an example of a cross-sectional configuration of the light source of FIG. 23A, which is rotated by 90 degrees in XY plane.
Figure 26B:
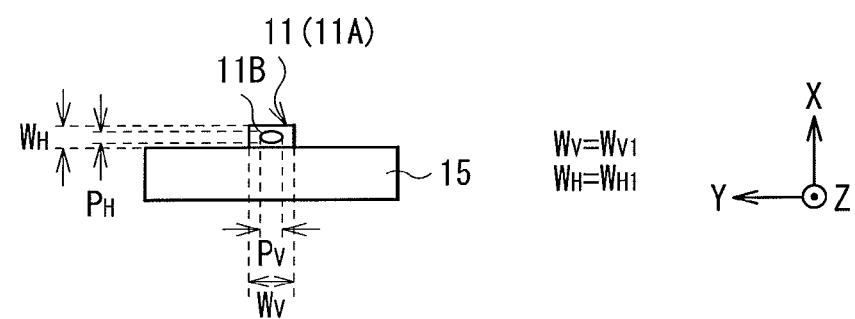
FIG. 26B is a diagram illustrating a solid-state light-emitting device included in the light source of FIG. 26A, viewed from a light emission surface side.

In the case where the solid-state light-emitting device 11 is configured of a single chip 11A, the size ($W_V * W_H$) of the solid-state light-emitting device 11 is equal to the size ($W_{V1} * W_{H1}$) of the single chip 11A as illustrated in FIGS. 23B and 26B, for example. On the other hand, in the case where the solid-state light-emitting device 11 is configured of a plurality of chips 11A, when all chips 11A are regarded as one group, the size of the solid-state light-emitting device 11 is equal to the size of the group as illustrated in FIGS. 21B, 22B, 24B, and 25B, for example. In the case where the plurality of chips 11A are arranged in a lateral line, the size ($W_V * W_H$) of the solid-state light-emitting device 11 is larger than $W_{V1} * 3W_{H1}$ in the example of FIG. 21B, and is larger than $W_{V1} * 2W_{H1}$ in the example of FIG. 22B. In addition, in the case where the plurality of chips 11A are arranged in a longitudinal line, the size ($W_V * W_H$) of the solid-state light-emitting device 11 is larger than $3W_{V1} * W_{H1}$ in the example of FIG. 24B, and is larger than $2W_{V1} * W_{H1}$ in the example of the FIG. 25B.

The chip 11A is configured with, for example, a laser diode (LD). All chips 11A included in the light sources 10A, 10B, 10C, and 10D may be configured with LDs. Moreover, chips 11A included in one or more of the light sources 10A, 10B, 10C, and 10D may be configured with LDs, and chips 11A included in other light sources may be configured with LEDs or OLEDs.

As illustrated in FIGS. 21A and 21B to FIGS. 26A and 26B, for example, each of the chips 11A includes the light-emission spot 11B having a size ($P_{V1} * P_{H1}$) smaller than the size ($W_V * W_H$) of the chip 11A. The light-emission spot 11B corresponds to a region (light emission region) in which light is emitted from the chip 11A when a current is injected into the chip 11A to drive the chip 11A. In a case where the chip 11A is configured of LD, the light-emission spot 11B is a dot-like shape smaller than the light-emission spot of the LED or OLED.

In the case where the solid-state light-emitting device 11 is configured of a single chip 11A, the number of the light-emission spot 11B is one as illustrated in FIGS. 23B and 26B, for example. On the other hand, in the case where the solid-state light-emitting device 11 is configured of a plurality of chips 11A, the number of the light-emission spots 11B is equal to the number of the chips 11A as illustrated in FIGS. 21B, 22B, 24B, and 25B, for example. In this case, in the case where the solid-state light-emitting device 11 is configured of a single chip 11A, the size ($P_V * P_H$) of the light emission region as the solid-state light-emitting device 11 is equal to the size ($P_{V1} * P_{H1}$) of the light-emission spot 11B. On the other hand, in the case where the solid-state light-emitting device 11 is configured of a plurality of chips 11A, the size ($P_V * P_H$) of the light emission region as the solid-state light-emitting device 11 is equal to the size of an enclosure which encloses the light-emission spots 11B of all chips 11A with a minimum inner area. In the case where a plurality of chips 11A are arranged in a lateral line, the size ($P_V * P_H$) of the light emission region is larger than $P_{V1} * 3P_{H1}$ but smaller than $W_V * W_H$ in the example of the FIG. 21B. Likewise, in the example of FIG. 22B, the size ($P_V * P_H$) of the light emission region is larger than $P_{V1} * 2P_{H1}$ but smaller than $W_V * W_H$. Moreover, in the case where a plurality of chips 11A are arranged in a longitudinal line, the size ($P_V * P_H$) of the light emission region is larger than $3P_{V1} * P_{H1}$ but smaller than $W_V * W_H$ in the example of FIG. 24B. Likewise, in the example of FIG. 25B, the size ($P_V * P_H$) of the light emission region is larger than $2P_{V1} * P_{H1}$ but smaller than $W_V * W_H$.

Modification 2

Moreover, in the above-described embodiments and the modification, although the illumination optical systems 1A, 3A, 4A, and 5A each are configured to include infinite optical system allowing parallelized light to enter the fly-eye lens 40A, the illumination optical systems 1A, 3A, 4A, and 5A each may be configured to include finite optical system allowing convergent light (or divergent light) to enter the fly-eye lens 40A. In this case, in the above-described embodiments and modification, in place of the coupling lenses 20A to 20D, a traveling-direction angle conversion device having a function of focusing or dispersing light emitted from the light sources 10A to 10D may be disposed. Incidentally, in this case, it is preferable that an optical magnification of the optical system configured with the above-described traveling-direction angle conversion device and the fly-eye lenses 40A and 40B be set so that each light source image S formed on the fly-eye lens 40B by each cell 41 of the fly-eye lens 40A has a size not exceeding the size of one cell 42 of the fly-eye lens 40B. Specifically, it is preferable that the optical magnification of the optical system configured with the above-described traveling-direction angle conversion device and the fly-eye lenses 40A and 40B satisfy the following relational expression.

$$h = P \times m \leq h_{FEL2}$$

where m is an optical magnification of the optical system configured with the above-described traveling-direction angle conversion device and the fly-eye lenses 40A and 40B.

Moreover, in the modification, in a case where each of the cells 41 and 42 of the fly-eye lenses 40A and 40B has an aspect ratio other than 1, the illumination optical systems 1A, 3A, 4A, and 5A each are preferably an anamorphic optical system.

Modification 3

Figure 27:
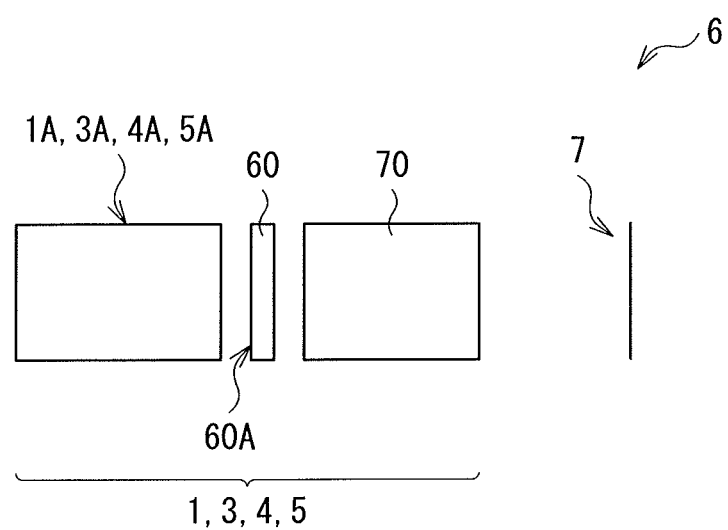
FIG. 27 is a diagram illustrating a schematic configuration of a rear-projection display device using an illumination optical system according to any of the above-described embodiments.

Furthermore, in the above-described embodiments and the modifications thereof, the case where the present technology is employed to a projection type display unit has been described, however, the present technology is surely applicable to other display devices. For example, as illustrated in FIG. 27, the present technology is applicable to a rear-projection display device 6. The rear-projection display device 6 includes the projector 1, 3, 4, or 5 including the illumination optical system 1A, 3A, 4A, or 5A, respectively, and a transmissive screen 7 displaying imaging light projected from the projector 1, 3, 4, or 5 (projection optical system 70) as illustrated in FIG. 27. In this way, the illumination optical system 1A, 3A, 4A, or 5A is used as the The application is claimed as follows:

1. An illumination unit, comprising:
   at least one light source which includes a solid-state light-emitting device having a light emission region;
   a plurality of traveling-direction angle conversion devices each configured to convert a traveling-direction angle of light that enters from the solid-state light-emitting device; and
   an integrator including a first fly-eye lens and a second fly-eye lens, the first fly-eye lens includes a plurality of first cells which receive light from the plurality of traveling-direction angle conversion devices, and the second fly-eye lens includes a plurality of second cells which receive light from the first fly-eye lens, wherein the integrator is configured to render illumination distribution uniform in an illumination area which is illuminated by light from the plurality of traveling-direction angle conversion devices,
   wherein the plurality of first cells are configured to generate a plurality of light source images on the second fly-eye lens, wherein an optical system, that includes the plurality of traveling-direction angle conversion devices, the first fly-eye lens, and second fly-eye lens, has an optical magnification which causes a size of each of the plurality of light source images to be smaller than a size of a second cell in the second fly-eye lens, and
   wherein a ratio of a horizontal magnification factor to a vertical magnification factor of each of the plurality of traveling-direction angle conversion devices is equal to an inverse of an aspect ratio of each second cell of the plurality of second cells in the second fly-eye lens.

2. The illumination unit according to claim 1, wherein the solid-state light-emitting device includes one of a chip configured to emit light in a wavelength range or a plurality of chips configured to emit light in one of a same wavelength range or different wavelength ranges, and the optical magnification of the optical system satisfies the following expression:

$$h = P*m \leq h_{FEL2}$$

where h is the size of each of the plurality of light source images,
P is a size of the light emission region, the size of the light emission region is equal to a size of a light-emission spot of the chip if the solid-state light-emitting device includes one chip, and the size of the light emission region is equal to a size of an enclosure which encloses light-emission spots of the plurality of chips with a minimum inner area if the solid-state light-emitting device includes the plurality of chips,
m is the optical magnification of the optical system, and
$h_{FEL2}$ is the size of each of the plurality of second cells in the second fly-eye lens.

3. The illumination unit according to claim 2, wherein each of the plurality of traveling-direction angle conversion devices is configured to convert the traveling-direction angle of the light that enters from the solid-state light-emitting device to be equal to or close to the traveling-direction angle of parallelized light, and
a focal length of each of the plurality of traveling-direction angle conversion devices and a focal length $f_{FEL}$ of each of the first fly-eye lens and the second fly-eye lens satisfy the following expression:

$$h = P*(f_{FEL}/f_{CL}) \leq h_{FEL2}$$

where $f_{CL}$ is the focal length of each of the plurality of traveling-direction angle conversion devices.

4. The illumination unit according to claim 3, wherein each of the plurality of first cells of the first fly-eye lens and each of the plurality of second cells of the second fly-eye lens has an aspect ratio other than 1, and
the focal length of each of the plurality of traveling-direction angle conversion devices and the focal length of each of the first fly-eye lens and the second fly-eye lens satisfy the following expressions:

$$h_x = P_x*(f_{FELx}/f_{CLx}) \leq h_{FEL2x}$$

$$h_y = P_y*(f_{FELy}/f_{CLy}) \leq h_{FEL2y}$$

where hx is the size in a first direction of the plurality of light source images,
hy is the size in a second direction orthogonal to the first direction of the plurality of light source images,
Px is the size in the first direction of the light emission region if the solid-state light-emitting device includes the one chip, the size of the light emission region is equal to the size in the first direction of the light-emission spot of the chip, and if the solid-state light-emitting device includes the plurality of chips, the size of the light emission region is equal to the size in the first direction of the enclosure which encloses the light-emission spots of the plurality of chips with the minimum inner area,
Py is the size in the second direction of the light emission region if the solid-state light-emitting device includes the one chip, the size of the light emission region is equal to the size in the second direction of the light-emission spot of the chip, and if the solid-state light-emitting device includes the plurality of chips, the size of the light emission region is equal to the size in the second direction of the enclosure which encloses the light-emission spots of the plurality of chips with the minimum inner area,
$f_{FELx}$ is the focal length in the first direction of the first fly-eye lens and the second fly-eye lens,
$f_{FELy}$ is the focal length in the second direction of the first fly-eye lens and the second fly-eye lens,
$f_{CLx}$ is the focal length in the first direction of each of the plurality of traveling-direction angle conversion devices,
$f_{CLy}$ is the focal length in the second direction of each of the plurality of traveling-direction angle conversion devices,
$h_{FEL2x}$ is the size in the first direction of each of the plurality of second cells in the second fly-eye lens, and
$h_{FEL2y}$ is the size in the second direction of each of the plurality of second cells in the second fly-eye lens.

5. The illumination unit according to claim 1, wherein the plurality of traveling-direction angle conversion devices have a focal length $f_{CL}$ and a numerical aperture NA which allow light which enters thereto to have a beam size less than a size of each of the plurality of traveling-direction angle conversion devices.

6. The illumination unit according to claim 5, wherein the focal length $f_{CL}$ and the numerical aperture NA of the plurality of traveling-direction angle conversion devices satisfy the following expression:

$$\varphi_{CL}=2*f_{CL}*NA \leq h_{CL}$$

where $\varphi_{CL}$ is the beam size of the light that enters the plurality of traveling-direction angle conversion devices, and $h_{CL}$ is the size of each of the plurality of traveling-direction angle conversion devices.

7. The illumination unit according to claim 6, wherein
the plurality of traveling-direction angle conversion devices have an aspect ratio other than 1, and
the focal length $f_{CL}$ and the numerical aperture NA of the plurality of traveling-direction angle conversion devices satisfy the following expressions:

$$\varphi_{CLx}=2*f_{CLx}*NA_x \leq h_{CLx}$$

$$\varphi_{CLy}=2*f_{CLy}*NA_y \leq h_{CLy}$$

where $\varphi_{CLx}$ is the beam size in a first direction of the light that enters the plurality of traveling-direction angle conversion devices, $\varphi_{CLy}$ is the beam size in a second direction of the light that enters the plurality of traveling-direction angle conversion devices, $NA_x$ is a first numerical aperture in the first direction of the plurality of traveling-direction angle conversion devices, $NA_y$ is a second the numerical aperture in the second direction of the plurality of traveling-direction angle conversion devices, $h_{CLx}$ is the size in the first direction of each of the plurality of traveling-direction angle conversion devices, and $h_{CLy}$ is the size in the second direction of each of the plurality of traveling-direction angle conversion devices.

8. The illumination unit according to claim 1, further comprising a light path unifying device, wherein
the illumination unit includes a plurality of light sources,
each of the plurality of light sources is in a manner of a package including the solid-state light-emitting device therein,
each of the plurality of traveling-direction angle conversion devices is configured to be arranged for each package, and
the light path unifying device is configured to unify light beams, which have passed through respective of the plurality of traveling-direction angle conversion devices, into a single light path.

9. The illumination unit according to claim 1, further comprising a light path unifying device, wherein
the illumination unit includes a plurality of light sources and a single traveling-direction angle conversion device,
each of the plurality of light sources is in a manner of a package including the solid-state light-emitting device therein,
the light path unifying device is configured to unify light beams emitted from the solid-state light-emitting device, into a single light path, and
the single traveling-direction angle conversion device is configured to convert the traveling-direction angle of light emitted from the light path unifying device to be equal to or close to the traveling-direction angle of parallelized light.

10. The illumination unit according to claim 1, wherein
the illumination unit includes a single light source, and
the single light source is in a manner of a package including the solid-state light-emitting device therein.

11. The illumination unit according to claim 2, wherein the chip is one of a light-emitting diode, an organic EL light-emitting device, or a laser diode.

* * * * *